(12) United States Patent
Sun et al.

(10) Patent No.: US 12,425,074 B2
(45) Date of Patent: Sep. 23, 2025

(54) BEAM MANAGEMENT METHOD AND APPARATUS

(71) Applicant: HUAWEI TECHNOLOGIES CO., LTD., Shenzhen (CN)

(72) Inventors: Huan Sun, Shenzhen (CN); Wei Xu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 94 days.

(21) Appl. No.: 18/492,032

(22) Filed: Oct. 23, 2023

(65) Prior Publication Data
US 2024/0048187 A1 Feb. 8, 2024

Related U.S. Application Data

(63) Continuation of application No. PCT/CN2022/084217, filed on Mar. 30, 2022.

(30) Foreign Application Priority Data

Apr. 30, 2021 (CN) .......................... 202110486557.0

(51) Int. Cl.
H04L 5/12 (2006.01)
H04B 7/04 (2017.01)
H04B 7/06 (2006.01)
H04B 17/27 (2015.01)

(52) U.S. Cl.
CPC ....... *H04B 7/04013* (2023.05); *H04B 7/0639* (2013.01); *H04B 17/27* (2015.01)

(58) Field of Classification Search
CPC ... H04B 7/04013; H04B 17/27; H04B 7/0639
USPC ................ 375/262, 260, 259, 219, 295, 316
See application file for complete search history.

(56) References Cited

U.S. PATENT DOCUMENTS

2019/0097712 A1    3/2019  Singh et al.
2024/0179669 A1*   5/2024  Manolakos ......... H04W 72/231
2024/0298288 A1*   9/2024  Duan .................... G01S 5/0244

* cited by examiner

Primary Examiner — Zewdu A Kassa
(74) Attorney, Agent, or Firm — Maier & Maier, PLLC

(57) ABSTRACT

A beam management method and apparatus to optimize a beam management procedure between a reconfigurable intelligent meta-surface (RIS) and a terminal device, so that beam management efficiency may be improved, and system overheads may be reduced. The method includes: determining first measurement information based on information of a beam set, sending the first measurement information, and communicating with a RIS through a first beam, where the beam set is determined based on first location information of a terminal device, the beam set includes one or more beams between the RIS and the terminal device, the first measurement information includes information determined by the terminal device based on a beam corresponding to a downlink reference signal, and the first beam is a beam in the beam set.

20 Claims, 12 Drawing Sheets

BEAM MANAGEMENT METHOD AND APPARATUS

CROSS-REFERENCE TO RELATED APPLICATIONS

This application is a continuation of International Patent Application No. PCT/CN2022/084217, filed on Mar. 30, 2022, which claims priority to Chinese Patent Application No. 202110486557.0, filed on Apr. 30, 2021. The disclosures of the aforementioned applications are hereby incorporated by reference in their entireties.

TECHNICAL FIELD

The embodiments relate to the communication field, and to a beam management method and apparatus.

BACKGROUND

A multiple-input multiple-output (MIMO) system may be used to obtain a large spatial multiplexing gain, and may enhance transmission channel quality, overcome obstruction of obstacles in a propagation path, and improve an energy efficiency ratio of a transmitting power. A reconfigurable intelligent meta-surface (RIS) technology may be used to dynamically control electromagnetic wave parameters (for example, an amplitude, a phase, polarization, and a spectrum), to implement a controllable transmission solution based on a wireless environment. A technology combining a RIS and MIMO is referred to as a RIS-MIMO technology, and may be used to improve performance of a low-frequency system or a high-frequency system.

In the RIS-MIMO system, the RIS is deployed in coverage of an access point, the access point and the RIS jointly implement data transmission for a terminal device, and the terminal device may communicate with the access point through the RIS. In a beam management process between the RIS and the terminal device, the access point configures a channel policy resource and a measurement slot, a control phase corresponding to the RIS in each measurement slot, and an uplink pilot signal of the terminal device in each measurement slot. The access point obtains downlink channel information in the measurement slot based on an uplink measurement result, and determines, by using the downlink channel information, a beam used for communication between the RIS and the terminal device.

In the foregoing solution, obtaining of channel information between the access point, the RIS, and the terminal device needs to be completed by a plurality of times of measurement. Consequently, measurement time is long, and system overheads are high.

SUMMARY

Embodiments provide a beam management method and apparatus, to optimize a beam management procedure between a reconfigurable intelligent meta-surface (RIS) and a terminal device, so that beam management efficiency may be improved, and system overheads may be reduced.

To achieve the foregoing objectives, the following solutions are used in the embodiments.

According to a first aspect, a beam management method is provided. The beam management method includes: determining first measurement information based on information of a beam set, sending the first measurement information, and communicating with a RIS through a first beam, where the beam set is determined based on first location information of a terminal device, the beam set includes one or more beams between the reconfigurable intelligent meta-surface (RIS) and the terminal device, the first measurement information includes information determined by the terminal device based on a beam corresponding to a downlink reference signal, and the first beam is a beam in the beam set.

Based on the beam management method according to the first aspect to the fourth aspect, a positioning server determines information of the first beam in the beam set based on the first measurement information determined by the terminal device based on the beam corresponding to the downlink reference signal and second measurement information determined by an access point based on a beam corresponding to an uplink reference signal, and the terminal device communicates with the RIS through the first beam. The beam set is determined based on the first location information of the terminal device. In this way, a beam management procedure between the RIS and the terminal device may be optimized, and there is no need to perform complex measurement, so that beam management efficiency may be improved, and system overheads may be reduced.

In a possible embodiment, the beam management method provided in the first aspect may further include: obtaining third measurement information based on positioning parameter information, where the positioning parameter information may include location information of the RIS, and the third measurement information may include information determined by the terminal device based on time of arrival of the downlink reference signal. In this way, the positioning server may obtain the first location information of the terminal device, to implement positioning of the terminal device.

In a possible embodiment, the positioning parameter information may further include an identifier of the access point and location information of the access point.

Optionally, the access point may include an access point serving the terminal device and/or another access point, for example, an access point of a neighboring cell, or an access point of a non-serving cell in a user tracking or user paging set.

In a possible embodiment, the beam management method provided in the first aspect may further include: sending the third measurement information. In other words, the terminal device may feed back the third measurement information to the access point or the positioning server, to determine location information of the terminal device.

In a possible embodiment, the beam management method provided in the first aspect may further include: receiving the positioning parameter information.

Optionally, the receiving the positioning parameter information may include: receiving positioning parameter information from the access point, or receiving positioning parameter information from the positioning server, or receiving positioning parameter information from the RIS.

In a possible embodiment, the beam management method provided in the first aspect may further include: receiving the information of the beam set.

Optionally, the receiving the information of the beam set may include: receiving information of a beam set from the access point, or receiving information of a beam set from the positioning server, or receiving information of a beam set from the RIS.

In a possible embodiment, the beam management method provided in the first aspect may further include: receiving the information of the first beam, where the information of the first beam may include information of a beam between the RIS and the terminal device. In this way, the terminal device may communicate with the RIS through the first beam.

In a possible embodiment, the beam set is a subset of a first set, and the first set may include all beams between the RIS and the terminal device. In this way, efficiency of measuring the beam corresponding to the downlink reference signal by the terminal device may be improved, beam alignment time may be shortened, and a used system resource or overhead ratio is reduced.

In a possible embodiment, the beam management method provided in the first aspect may further include: receiving resource information, where the resource information may include a time frequency resource and slot indication information, and the slot indication information may indicate a slot for measuring the uplink reference signal and the downlink reference signal.

Optionally, the receiving resource information may include: receiving resource information from the access point, or receiving resource information from the positioning server, or receiving resource information from the RIS.

Optionally, the determining first measurement information based on information of a beam set may include: determining the first measurement information based on the information of the beam set and the resource information. In other words, the terminal device may perform, based on the resource information used for beam management and the information, about the beam set, used for beam management, beam scanning on the beam corresponding to the downlink reference signal, to obtain beam measurement information.

According to a second aspect, a beam management method is provided. The beam management method includes: determining information of a first beam based on first measurement information and second measurement information, and sending the information of the first beam, where the first beam is a beam in a beam set, the beam set is determined based on first location information of a terminal device, the beam set includes one or more beams between an RIS and the terminal device, the first measurement information includes information determined by the terminal device based on a beam corresponding to a downlink reference signal, and the second measurement information includes information determined by an access point based on a beam corresponding to an uplink reference signal.

In a possible embodiment, the beam management method provided in the second aspect may further include: determining the first location information based on third measurement information and fourth measurement information, where the third measurement information may include information determined by the terminal device based on time of arrival of the downlink reference signal, and the fourth measurement information may include information determined by the access point based on time of arrival of the uplink reference signal. In this way, a single access point may position the terminal device, a method is simple, calculation complexity of the terminal device may be reduced, and power consumption of the terminal device may be reduced.

Optionally, the first location information may include information of one or more locations.

In a possible embodiment, the beam management method provided in the second aspect may further include: sending positioning parameter information, where the positioning parameter information may include location information of the RIS.

In a possible embodiment, the positioning parameter information may further include an identifier of the access point and location information of the access point.

In a possible embodiment, the beam management method provided in the second aspect may further include: sending information of the beam set.

In a possible embodiment, the beam management method provided in the second aspect may further include: determining second location information of the terminal device based on the first measurement information and the second measurement information, where precision of the second location information is higher than precision of the first location information.

In other words, location information of the terminal device may be optimized by using measurement data of the beam between the RIS and the terminal device, and precision of the optimized location information of the terminal device is higher than the precision of the first location information. In this way, positioning precision of the terminal device may be improved.

In a possible embodiment, the beam set is a subset of a first set, and the first set may include all beams between the RIS and the terminal device.

In a possible embodiment, the beam management method provided in the second aspect may further include: sending resource information, where the resource information may include a time frequency resource and slot indication information, and the slot indication information may indicate a slot for measuring the uplink reference signal and the downlink reference signal.

In addition, for effects of the beam management method according to the second aspect, refer to the effects of the beam management method according to the first aspect. Details are not described herein again.

According to a third aspect, a beam management method is provided. The beam management method includes: obtaining second measurement information based on information of a beam set, and sending the second measurement information, where the beam set is determined based on first location information of a terminal device, the beam set includes one or more beams between an RIS and the terminal device, and the second measurement information includes information determined by an access point based on a beam corresponding to an uplink reference signal.

In this way, the access point may feed back the second measurement information to a positioning server, to determine a beam used for communication between the RIS and the terminal device.

In a possible embodiment, the beam management method provided in the third aspect may further include: obtaining fourth measurement information based on positioning parameter information, where the positioning parameter information may include location information of the RIS, and the fourth measurement information may include information determined by the access point based on time of arrival of the uplink reference signal.

In a possible embodiment, the positioning parameter information may further include an identifier of the access point and location information of the access point.

In a possible embodiment, the beam management method provided in the third aspect may further include: sending the fourth measurement information.

In a possible embodiment, the beam management method provided in the third aspect may further include: receiving the positioning parameter information.

In a possible embodiment, the beam management method provided in the third aspect may further include: receiving the information of the beam set.

In a possible embodiment, the beam set is a subset of a first set, and the first set may include all beams between the RIS and the terminal device.

In a possible embodiment, the beam management method provided in the third aspect may further include: receiving resource information, where the resource information may include a time frequency resource and slot indication information, and the slot indication information may indicate a slot for measuring the uplink reference signal and a downlink reference signal.

In addition, for effects of the beam management method according to the third aspect, refer to the effects of the beam management method according to the first aspect. Details are not described herein again.

According to a fourth aspect, a beam management method is provided. The beam management method includes: sending positioning parameter information, receiving information of a first beam, and communicating with a terminal device through the first beam, where the positioning parameter information includes location information of an RIS, the information of the first beam includes information of a beam between the RIS and a terminal device, the first beam is a beam in a beam set, the beam set is determined based on first location information of the terminal device, and the beam set includes one or more beams between the RIS and the terminal device.

In a possible embodiment, the beam management method provided in the fourth aspect may further include: receiving information of the beam set.

In a possible embodiment, the beam set is a subset of a first set, and the first set may include all beams between the RIS and the terminal device.

In a possible embodiment, the beam management method provided in the fourth aspect may further include: receiving resource information, where the resource information may include a time frequency resource and slot indication information, and the slot indication information may indicate a slot for measuring an uplink reference signal and a downlink reference signal.

In addition, for effects of the beam management method according to the fourth aspect, refer to the effects of the beam management method according to the first aspect. Details are not described herein again.

According to a fifth aspect, a beam management apparatus is provided. The apparatus includes a transceiver module and a processing module.

The processing module is configured to determine first measurement information based on information of a beam set, where the beam set is determined based on first location information of the beam management apparatus, the beam set includes one or more beams between an RIS and the beam management apparatus, and the first measurement information includes information determined by the beam management apparatus based on a beam corresponding to a downlink reference signal.

The transceiver module is configured to send the first measurement information.

The transceiver module is further configured to communicate with the RIS through a first beam, where the first beam is a beam in the beam set.

In a possible embodiment, the processing module is further configured to obtain third measurement information based on positioning parameter information, where the positioning parameter information may include location information of the RIS, and the third measurement information may include information determined by the beam management apparatus based on time of arrival of the downlink reference signal.

In a possible embodiment, the positioning parameter information may include an identifier of an access point and location information of the access point.

In a possible embodiment, the transceiver module is further configured to send the third measurement information.

In a possible embodiment, the transceiver module is further configured to receive the positioning parameter information.

In a possible embodiment, the transceiver module is further configured to receive the information of the beam set.

In a possible embodiment, the transceiver module is further configured to receive information of the first beam, where the information of the first beam may include information of a beam between the RIS and the beam management apparatus.

In a possible embodiment, the beam set is a subset of a first set, and the first set may include all beams between the RIS and the beam management apparatus.

In a possible embodiment, the transceiver module is further configured to receive resource information, where the resource information may include a time frequency resource and slot indication information, and the slot indication information may indicate a slot for measuring an uplink reference signal and the downlink reference signal.

It should be noted that the transceiver module in the fifth aspect may include a receiving module and a sending module. The receiving module is configured to receive data and/or signaling from a positioning server, the access point, and/or the RIS. The sending module is configured to send data and/or signaling to the positioning server, the access point, and/or the RIS. A specific implementation of the transceiver module is not limited.

Optionally, the beam management apparatus according to the fifth aspect may further include a storage module. The storage module stores a program or instructions. When the processing module executes the program or the instructions, the beam management apparatus according to the fifth aspect may be enabled to perform the method according to the first aspect.

It should be noted that the beam management apparatus according to the fifth aspect may be a terminal device, or may be a chip (system) or another part or component that may be disposed in the terminal device. This is not limited.

In addition, for effects of the beam management apparatus according to the fifth aspect, refer to the effects of the beam management method according to any possible implementation of the first aspect. Details are not described herein again.

According to a sixth aspect, a beam management apparatus is provided. The apparatus includes a transceiver module and a processing module.

The processing module is configured to determine information of a first beam based on first measurement information and second measurement information, where the first beam is a beam in a beam set, the beam set is determined based on first location information of a terminal device, the beam set includes one or more beams between an RIS and the terminal device, the first measurement information includes information determined by the terminal device based on a beam corresponding to a downlink reference signal, and the second measurement information includes information determined by an access point based on a beam corresponding to an uplink reference signal.

The transceiver module is configured to send the information of the first beam.

In a possible embodiment, the processing module is further configured to determine the first location information based on third measurement information and fourth measurement information, where the third measurement information may include information determined by the terminal device based on time of arrival of the downlink reference signal, and the fourth measurement information may include information determined by the access point based on time of arrival of the uplink reference signal.

In a possible embodiment, the transceiver module is further configured to send positioning parameter information, where the positioning parameter information may include location information of the RIS, and the positioning parameter information may be used to determine the third measurement information or the fourth measurement information.

In a possible embodiment, the positioning parameter information may further include an identifier of the access point and location information of the access point.

In a possible embodiment, the transceiver module is further configured to send information of the beam set.

In a possible embodiment, the processing module is further configured to determine second location information of the terminal device based on the first measurement information and the second measurement information, where precision of the second location information is higher than precision of the first location information.

In a possible embodiment, the beam set is a subset of a first set, and the first set may include all beams between the RIS and the terminal device.

In a possible embodiment, the transceiver module is further configured to send resource information, where the resource information may include a time frequency resource and slot indication information, and the slot indication information may indicate a slot for measuring the uplink reference signal and the downlink reference signal.

It should be noted that the transceiver module in the sixth aspect may include a receiving module and a sending module. The receiving module is configured to receive data and/or signaling from the terminal device, the access point, and/or the RIS. The sending module is configured to send data and/or signaling to the terminal device, the access point, and/or the RIS. Alternatively, the receiving module is configured to receive data and/or signaling from the terminal device, a positioning server, and/or the RIS. The sending module is configured to send data and/or signaling to the terminal device, the positioning server, and/or the RIS. A specific implementation of the transceiver module is not limited.

Optionally, the beam management apparatus according to the sixth aspect may further include a storage module. The storage module stores a program or instructions. When the processing module executes the program or the instructions, the beam management apparatus according to the sixth aspect may be enabled to perform the method according to the second aspect.

It should be noted that the beam management apparatus according to the sixth aspect may be a positioning server or an access point, or may be a chip (system) or another part or component that may be disposed in the positioning server or the access point. This is not limited.

In addition, for effects of the beam management apparatus according to the sixth aspect, refer to the effects of the beam management method according to any possible implementation of the second aspect. Details are not described herein again.

According to a seventh aspect, a beam management apparatus is provided. The apparatus includes a transceiver module and a processing module.

The processing module is configured to obtain second measurement information based on information of a beam set, where the beam set is determined based on first location information of a terminal device, the beam set includes one or more beams between an RIS and the terminal device, and the second measurement information includes information determined by the beam management apparatus based on a beam corresponding to an uplink reference signal.

The transceiver module is configured to send the second measurement information.

In a possible embodiment, the processing module is further configured to obtain fourth measurement information based on positioning parameter information, where the positioning parameter information may include location information of the RIS, and the fourth measurement information may include information determined by the beam management apparatus based on time of arrival of the uplink reference signal.

In a possible embodiment, the positioning parameter information may further include an identifier of the beam management apparatus and location information of the beam management apparatus.

In a possible embodiment, the transceiver module is further configured to send the fourth measurement information.

In a possible embodiment, the transceiver module is further configured to receive the positioning parameter information.

In a possible embodiment, the transceiver module is further configured to receive the information of the beam set.

In a possible embodiment, the beam set is a subset of a first set, and the first set may include all beams between the RIS and the terminal device.

In a possible embodiment, the transceiver module is further configured to receive resource information, where the resource information may include a time frequency resource and slot indication information, and the slot indication information may indicate a slot for measuring the uplink reference signal and a downlink reference signal.

It should be noted that the transceiver module in the seventh aspect may include a receiving module and a sending module. The receiving module is configured to receive data and/or signaling from the terminal device, a positioning server, and/or the RIS. The sending module is configured to send data and/or signaling to the terminal device, the positioning server, and/or the RIS. A specific implementation of the transceiver module is not limited.

Optionally, the beam management apparatus according to the seventh aspect may further include a storage module. The storage module stores a program or instructions. When the processing module executes the program or the instructions, the beam management apparatus according to the seventh aspect may be enabled to perform the method according to the third aspect.

It should be noted that the beam management apparatus according to the seventh aspect may be an access point, or may be a chip (system) or another part or component that may be disposed in the access point. This is not limited.

In addition, for effects of the beam management apparatus according to the seventh aspect, refer to the effects of the beam management method according to any possible implementation of the third aspect. Details are not described herein again.

According to an eighth aspect, a beam management apparatus is provided. The apparatus includes a sending module and a receiving module.

The sending module is configured to send positioning parameter information, where the positioning parameter information includes location information of the beam management apparatus.

The receiving module is configured to receive information of a first beam, where the information of the first beam includes information of a beam between the beam management apparatus and a terminal device, the first beam is a beam in a beam set, the beam set is determined based on first location information of the terminal device, and the beam set includes one or more beams between the beam management apparatus and the terminal device.

The sending module and the receiving module are further configured to communicate with the terminal device through the first beam.

Optionally, the sending module is configured to implement a sending function related to communication with the terminal device through the first beam. The receiving module is configured to implement a receiving function related to the communication with the terminal device through the first beam.

In a possible embodiment, the receiving module is further configured to receive information of the beam set.

In a possible embodiment, the beam set is a subset of a first set, and the first set may include all beams between a RIS and the terminal device.

In a possible embodiment, the receiving module and the sending module are further configured to receive resource information, where the resource information may include a time frequency resource and slot indication information, and the slot indication information may indicate a slot for measuring an uplink reference signal and a downlink reference signal.

It should be noted that the receiving module and the sending module may be separately disposed, or may be integrated into one module, such as a transceiver module. Specific implementations of the receiving module and the sending module are not limited. The receiving module is configured to receive data and/or signaling from the terminal device, a positioning server, and/or an access point. The sending module is configured to send data and/or signaling to the terminal device, the positioning server, and/or the access point.

Optionally, the beam management apparatus according to the eighth aspect may further include a storage module. The storage module stores a program or instructions. The beam management apparatus may further include a processing module. When the processing module executes the program or the instructions, the beam management apparatus according to the eighth aspect may be enabled to perform the method according to the fourth aspect.

It should be noted that the beam management apparatus according to the eighth aspect may be a RIS, or may be a chip (system) or another part or component that may be disposed in the RIS. This is not limited.

In addition, for effects of the beam management apparatus according to the eighth aspect, refer to the effects of the beam management method according to any possible implementation of the fourth aspect. Details are not described herein again.

According to a ninth aspect, a beam management apparatus is provided. The beam management apparatus includes a processor. The processor is coupled to a memory, and the memory is configured to store a computer program.

The processor is configured to execute the computer program stored in the memory, so that the beam management apparatus performs the beam management method according to any possible implementation of the first aspect to the fourth aspect.

In a embodiment, the beam management apparatus according to the ninth aspect may further include a transceiver. The transceiver may be a transceiver circuit or an input/output port. The transceiver may be used by the beam management apparatus to communicate with another device.

It should be noted that the input port may be configured to implement the receiving function in the first aspect to the fourth aspect, and the output port may be configured to implement the sending function in the first aspect to the fourth aspect.

In the embodiments, the beam management apparatus according to the ninth aspect may be a terminal device, a positioning server, an access point, or a RIS, or may be a chip or a chip system disposed inside the terminal device, the positioning server, the access point, or the RIS.

In addition, for effects of the beam management apparatus according to the ninth aspect, refer to the effects of the beam management method according to any implementation of the first aspect to the fourth aspect. Details are not described herein again.

According to a tenth aspect, a communication system is provided. The communication system includes a terminal device, a positioning server, an access point, and a RIS.

According to an eleventh aspect, a chip system is provided. The chip system includes a processor and an input/output port. The processor is configured to implement the processing function in the first aspect to the fourth aspect, and the input/output port is configured to implement the receiving and sending functions in the first aspect to the fourth aspect. The input port may be configured to implement the receiving function in the first aspect to the fourth aspect, and the output port may be configured to implement the sending function in the first aspect to the fourth aspect.

In a embodiment, the chip system further includes a memory. The memory is configured to store program instructions and data for implementing functions in the first aspect to the fourth aspect.

The chip system may include a chip, or may include a chip and another discrete component.

According to a twelfth aspect, a non-transitory computer-readable storage medium is provided. The non-transitory computer-readable storage medium includes a computer program or instructions. When the computer program or the instructions are run on a computer, the beam management method according to any possible implementation of the first aspect to the fourth aspect is performed.

According to a thirteenth aspect, a computer program product is provided. The computer program product includes a computer program or instructions. When the computer program or the instructions are run on a computer, the beam management method according to any possible implementation of the first aspect to the fourth aspect is performed.

DETAILED DESCRIPTION OF EMBODIMENTS

The following describes solutions with reference to accompanying drawings.

The solutions in the embodiments may be applied to various communication systems, for example, a wireless fidelity (Wi-Fi) system, a vehicle-to-everything (V2X) communication system, a device-to-device (D2D) communication system, an internet of vehicles communication system, 4th generation (4G) mobile communication systems such as a long term evolution (LTE) system and a worldwide interoperability for microwave access (WiMAX) communication system, 5th generation (5G) mobile communication systems such as a new radio (NR) system, and future communication systems such as a 6th generation (6G) mobile communication system.

Various aspects, embodiments, or features are presented by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in the embodiments, terms such as "example" and "for example" are used to represent giving an example, an illustration, or a description. Any embodiment or design scheme described as an "example" should not be explained as being more preferred or having more advantages than another embodiment or design scheme. Exactly, the term "example" is used to present a concept in a specific manner.

In the embodiments, sometimes a subscript, for example, $W_1$, may be written incorrectly in a non-subscript form, for example, W1. Expressed meanings are consistent when differences are not emphasized.

A network architecture and a service scenario described in embodiments are intended to describe the solutions in the embodiments more clearly, and do not constitute a limitation on the solutions provided in the embodiments. A person of ordinary skill in the art may know that, with evolution of the network architecture and emergence of new service scenarios, the solutions provided in the embodiments are also applicable to similar problems.

Figure 1:
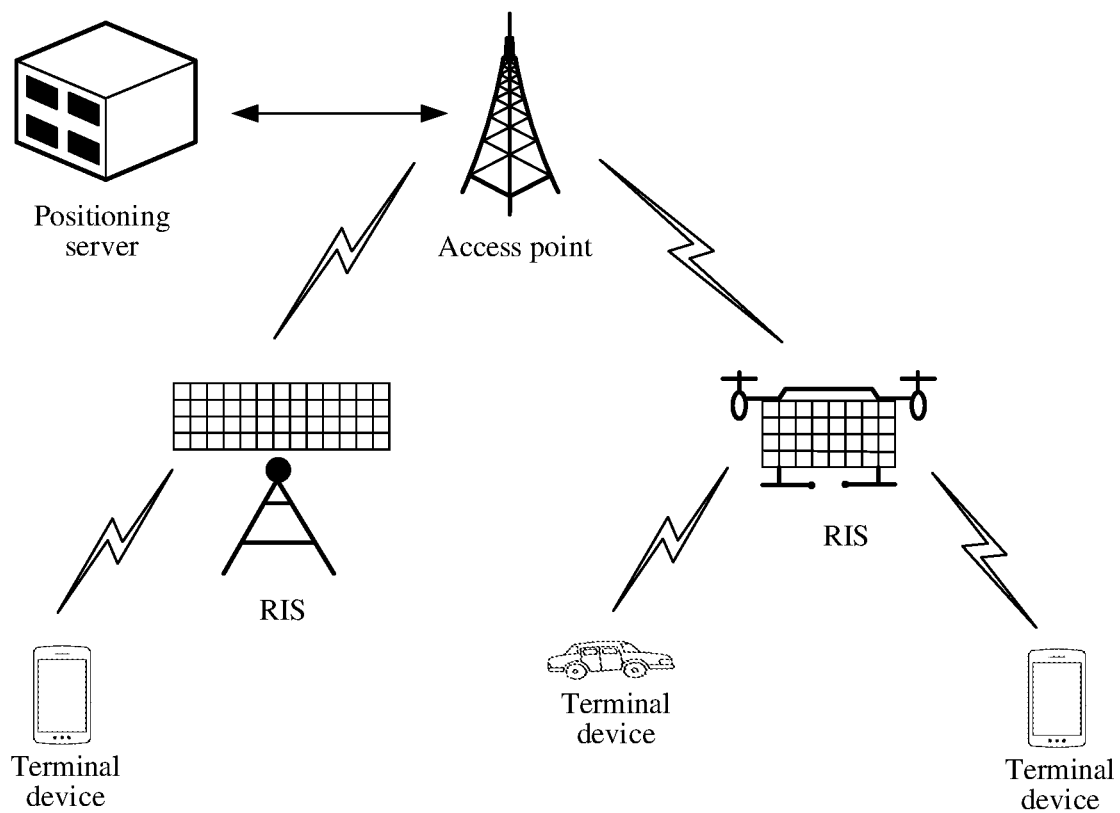
FIG. 1 is a schematic diagram of an architecture of a communication system according to an embodiment.

For ease of understanding embodiments, a communication system shown in FIG. 1 is first used as an example to describe in detail a communication system to which embodiments are applicable. For example, FIG. 1 is a schematic diagram of an architecture of a communication system to which a beam management method according to an embodiment is applicable.

As shown in FIG. 1, the communication system includes a positioning server, an access point, a RIS, and a terminal device. There may be one or more RIS s, there may be one or more terminal devices, and one RIS can communicate with one or more terminal devices. The RIS may be fixed, or the RIS may be mobile.

The positioning server may be a location management function (LMF), or may be referred to as a location service management function or a location management network element. Optionally, the communication system may further include an access and mobility management function (AMF), which may also be referred to as an access and mobility management network element. The LMF may communicate with the AMF through a logical interface (for example, an NL 1 interface). The access and mobility management network element may send data sent by the access point to the positioning server, or may send data sent by the positioning server to the access point; and is equivalent to a router for communication between the access point and the positioning server.

The access point is a device that is located on a network side of the communication system and has a wireless receiving and sending functions, or a chip or a chip system that may be disposed in the device. The access point includes, but is not limited to: an access point (AP) in a wireless fidelity (Wi-Fi) system such as a home gateway, a router, a server, a switch, or a bridge, an evolved NodeB (eNB), a radio network controller (RNC), a home base station (for example, a home evolved NodeB or a home NodeB, HNB), a radio relay node, a radio backhaul node, a transmission reception point (TRP) or a transmission point (TP), or the like, or may be a gNB in 5G such as an NR system, a transmission point (a TRP or a TP), one or a group of antenna panels (including a plurality of antenna panels) of a base station in a 5G system, or a satellite, or may be a network node, for example, a baseband unit (BBU), a distributed unit (DU), or a road side unit (RSU) having a base station function, that forms a gNB or a transmission point. The access point may further be a radio controller in a cloud radio access network (CRAN) scenario, a device in a future evolved public land mobile network (PLMN), or a wearable device or a vehicle-mounted device, and may further include a device that performs a base station function or the like in device-to-device (D2D) communication, vehicle-to-everything (V2X) communication, machine-to-machine (M2M) communication, and internet of things communication.

The terminal device is a terminal that accesses the communication system and has wireless receiving and sending functions, or a chip or a chip system that may be disposed in the terminal. The terminal device may also be referred to as user equipment (UE), a user apparatus, an access terminal, a subscriber unit, a subscriber station, a mobile station (MS), a remote station, a remote terminal, a mobile device, a user terminal, a terminal, a wireless unit, a terminal station, a terminal apparatus, a wireless communication device, a user agent, or a user apparatus. For example, the terminal device in the embodiments may be a mobile phone, a wireless data card, a personal digital assistant (PDA) computer, a laptop computer, a tablet computer (Pad), a computer having a wireless transceiver function, a machine-type communication (MTC) terminal, a virtual reality (VR) terminal device, an augmented reality (AR) terminal device, an internet of things (IoT) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home (for example, a game console, a smart television, a smart speaker, a smart refrigerator, and fitness equipment), a vehicle-mounted terminal, and an RSU having a terminal function. The access terminal may be a cellular phone, a cordless phone, a session initiation protocol (SIP) phone, a wireless local loop (WLL) station, a personal digital assistant (PDA), a handheld device (handset) having a wireless communication function, a computing device or another processing device connected to a wireless modem, a wearable device, or the like. For another example, the terminal device in the embodiments may be an express delivery terminal in smart logistics (for example, a device that can monitor a location of a cargo vehicle, and a device that can monitor a temperature and humidity of goods), a wireless terminal in smart agriculture (for example, a wearable device that can collect related data of livestock), a wireless terminal in smart buildings (for example, a smart elevator, a fire monitoring device, and a smart meter), a wireless terminal in smart healthcare (for example, a wearable device that can monitor a physiological status of a person or an animal), a wireless terminal in smart transportation (for example, a smart bus, a smart vehicle, a shared bicycle, a charging pile monitoring device, a smart traffic light, a smart monitoring device, and a smart parking device), and a wireless terminal in smart retail (for example, a vending machine, a self-service checkout machine, and an unmanned convenience store). For another example, the terminal device may be a vehicle-mounted module, a vehicle-mounted component, a vehicle-mounted chip, or a vehicle-mounted unit that is built in a vehicle as one or more components or units. The vehicle may implement the method provided through the vehicle-mounted module, the vehicle-mounted component, the vehicle-mounted chip, or the vehicle-mounted unit that is built in the vehicle.

The RIS is a device that accesses the communication system and can communicate with the terminal device. The access point may jointly provide a service for the terminal device with one or more RIS arrays. The RIS may be deployed in a wireless communication network in a form of hardware. The RIS may be deployed in a centralized manner, a distributed manner, or a stationary manner, or may be deployed on a mobile carrier (for example, an unmanned aerial vehicle). The RIS includes a plurality of units, and RISs operating on different frequency bands (sub 10 GHz, MMW, THz, and the like) correspond to different quantities of array units or different array area sizes. For example, a RIS operating at 10.5 GHz includes more than 10000 units. Channels between the access point and the RIS and between the RIS and the terminal device have a strong line of sight (LOS) and one or more weak non-line of sights (NLOSs). A degree of user performance improvement depends on channel quality between the RIS and the terminal device, and the channel quality depends on a gain of a beam from the RIS to the terminal device.

Figure 2:
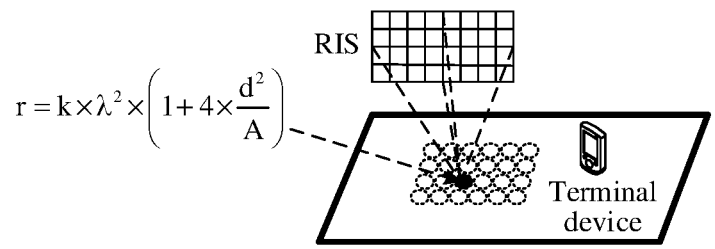
FIG. 2 is a schematic diagram of a RIS according to an embodiment.

With reference to FIG. 2, a spatial resolution r of the RIS is related to an array area A, a distance d from the RIS to the terminal device, and a wavelength $\lambda$ of an electromagnetic wave. The spatial resolution r may be expressed as the following formula:

$$r = k \times \lambda^2 \times \left(1 + 4 \times \frac{d^2}{A}\right).$$

In the foregoing formula, k is a constant. Therefore, when the RIS is used in a high frequency system, the RIS has a quite high spatial resolution, and channel quality between the RIS and the terminal device may be greatly improved. However, in this case, more optional beams are required or a larger beam set is required, to cover a same area.

It should be noted that the beam management method provided in the embodiments is applicable to any two nodes shown in FIG. 1, for example, between the positioning server and the access point, between the access point and the RIS, between the access point and the terminal device, between the RIS and the terminal device, and between the positioning server and the terminal device. For a specific implementation, refer to the following method embodiments. Details are not described herein again.

It should be noted that, the solutions in the embodiments may also be used in another communication system, and a corresponding name may also be replaced with a name of a corresponding function in the another communication system.

It should be understood that FIG. 1 is merely an example of the communication system to which embodiments are applicable for description, and does not limit a type, a quantity, a connection manner, and the like of network elements included in the communication system to which is the embodiments are applicable. For example, the communication system may further include one or both of a service location protocol (SLP) and an evolved serving mobile location center (E-SMLC). This is not limited.

A solution in which beam management between the RIS and the terminal device is performed based on channel information causes long measurement time and high system overheads. If M antennas (where M is greater than or equal to 1) are configured for the access point, and a quantity of array units of the RIS is N (where N is greater than or equal to 1), a quantity of antennas of the terminal device UE is 1, and a channel parameter between the access point, the RIS, and the UE includes M×N×1 parameters. In addition, phase control of the RIS is a time domain-based control manner. If a measurement result of one channel parameter is obtained through measurement each time, obtaining the channel information requires M×N slots. Consequently, problems of a long measurement period, easy aging of a measurement channel, an increase in a transmission delay, and the like are caused.

In a solution in which beam management between the RIS and the terminal device is implemented based on a high frequency beam management (BM) procedure, the access point configures a BM time sequence, a downlink reference signal, and a control phase corresponding to the RIS for the terminal device. The terminal device performs downlink reference signal measurement, and feeds back received quality related to each beam, for example, a reference signal received power (RSRP). The access point selects, based on received quality, of a beam, that is received from the terminal device, an appropriate beam for communication between the RIS and the terminal device. However, in the foregoing solution, because the RIS includes a large quantity of units, and a training beam set of the RIS is large, a time period required by the access point to perform a beam management procedure to implement beam alignment between the RIS and the terminal device is still large.

In a solution in which the access point or the RIS implements beam management between the RIS and the terminal device by using location information of the terminal device, the access point measures and divides a virtual location in coverage based on a spatial electromagnetic characteristic of a beam of the RIS, and establishes a channel fingerprint database. After the terminal device enters the coverage, the access point measures an uplink reference signal from the terminal device, to obtain a measurement result, and compares the measurement result with the channel fingerprint database, to position the terminal device, and obtain the location information of the terminal device. Then, the access point selects the appropriate beam based on the location information of the terminal device for communication between the RIS and the terminal device. However, this solution is designed for a special coverage scenario. First, a large amount of measurement and data processing need to be performed to establish the channel fingerprint database. Consequently, measurement time is long, and system overheads are high. In addition, for a terminal device in a time-varying environment or in a moving state, a performance loss of the solution is great, and an scope of the solution is limited.

To resolve the foregoing problem, the embodiments propose that beam management between the RIS and the terminal device is implemented by using the location information of the terminal device, so that system overheads may be reduced. There is no need to measure all channel information of a channel between the access point, the RIS, and the terminal device. A plurality of access points do not need to cooperate to complete assisted positioning of the terminal device. A measurement and feedback procedure between the terminal device and the plurality of access points is not required. The terminal device does not need to feed back measurement information of the plurality of access points to the positioning server. There is no need to measure electromagnetic information of a transmission environment and establish the channel fingerprint database in advance.

In addition, in the method provided in the embodiments, the terminal device and the access point need to configure, measure, and feed back parameters related to the access point, the RIS, and the terminal device. The RIS may not participate in the feedback, but only receive configuration information and participate in the measurement process. A hardware configuration requirement for the access point is low. A single access point may be configured with a single antenna or a plurality of antennas. The RIS may be deployed in a plurality of manners, for example, a centralized manner, a distributed manner, or a stationary manner, or may be deployed on a mobile carrier (for example, an unmanned aerial vehicle). A requirement for the terminal device is low, and the terminal device may not support a plurality of complex standards such as carrier aggregation (CA) or dual connectivity (DC), so that terminal costs may be reduced.

The following describes the beam management method provided in the embodiments with reference to FIG. 3 to FIG. 12. The beam management method provided in the embodiments is applicable to a scenario in which an access point, a RIS, and a terminal device are deployed at different heights, or a scenario in which an access point, a RIS, and a terminal device are deployed at a same height.

Figure 3:
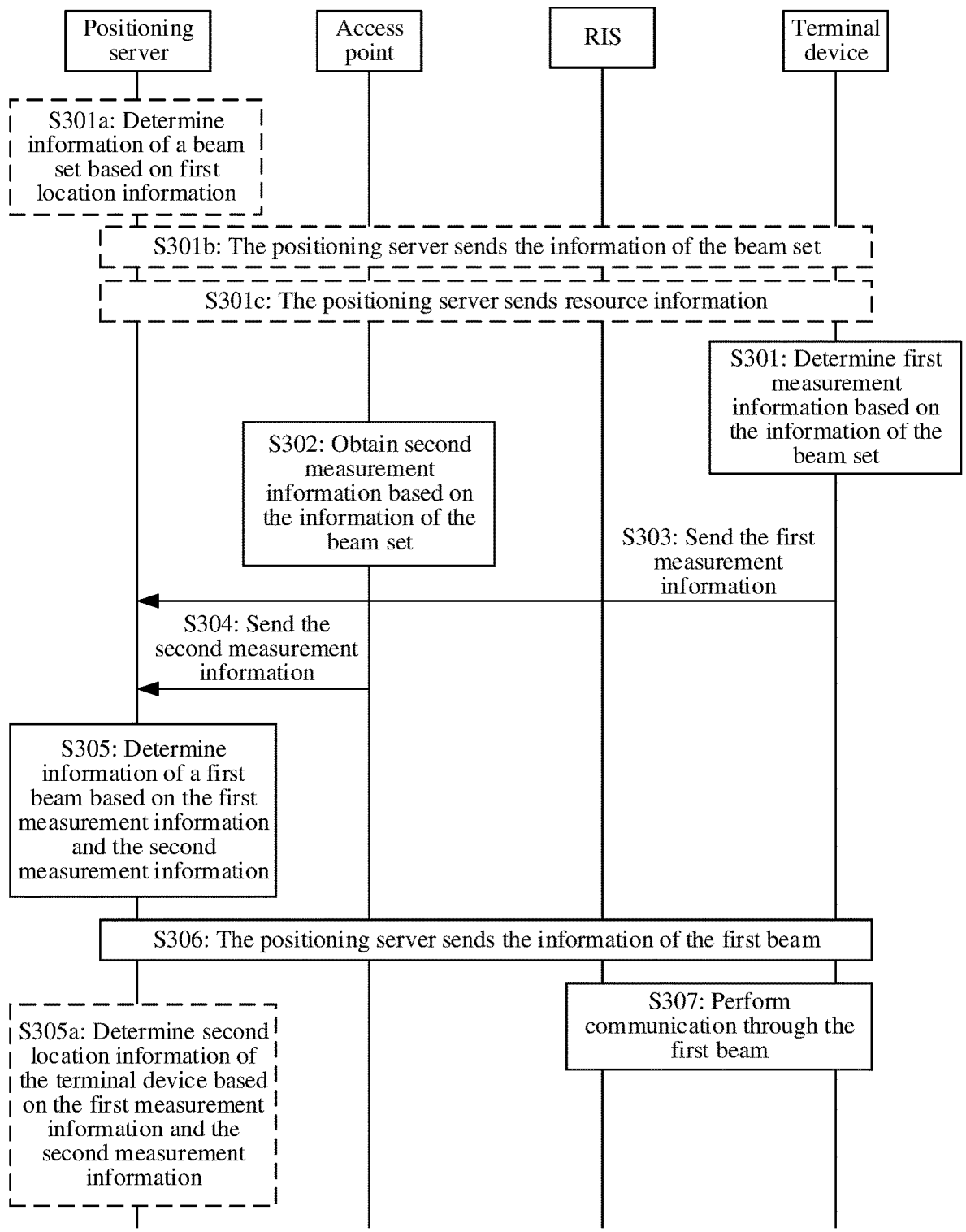
FIG. 3 is a schematic flowchart of a beam management method according to an embodiment.

For example, FIG. 3 is a schematic flowchart of a beam management method according to an embodiment. The beam management method is applicable to communication between any two nodes shown in FIG. 1. In the beam management method shown in FIG. 3, a transmission manner based on an intelligent environment is used. In the transmission manner, a RIS is used to control a wireless intelligent environment, and a positioning server performs beam management between the RIS and a terminal device, so that system overheads may be reduced.

As shown in FIG. 3, the beam management method includes the following steps.

S301: The terminal device determines first measurement information based on information of a beam set.

For example, the beam set may include one or more beams between the RIS and the terminal device, and the beam set is determined based on first location information of the terminal device.

For example, the first location information of the terminal device may include information of one or more locations.

Optionally, the first location information may include information of one or more locations determined by the positioning server, and/or information of one or more locations determined by a GPS or another system. For example, in an indoor scenario, the first location information determined by the positioning server may be used. In an outdoor scenario, the first location information determined by the GPS may be used, and the GPS determines the first location information and sends the first location information to the positioning server. In this way, good data transmission may be maintained between an access point and the terminal device, and robust transmission may be implemented.

Optionally, one beam set may be designed for each location of the terminal device.

For example, assuming that the first location information of the terminal device includes a location 1 or a location 2, a beam set 1 corresponding to the location 1 may be determined, and the beam set 1 includes one or more beams; and a beam set 2 corresponding to the location 2 may be determined, and the beam set 2 includes one or more beams. In this way, the determined beam set may be used to combine with a beam management mechanism, to determine the location of the terminal device, and the determined beam set may be used to complete beam alignment between the RIS and the terminal device.

In some embodiments, the beam management method may further include the following step.

S301a: The positioning server determines the information of the beam set based on the first location information.

In other words, the beam set may be determined by the positioning server based on the first location information of the terminal device.

For example, the positioning server may design or update the one or more beams between the RIS and the terminal device based on the first location information of the terminal device.

In some embodiments, the first measurement information may include information determined by the terminal device based on a beam corresponding to a downlink reference signal.

Figure 4:
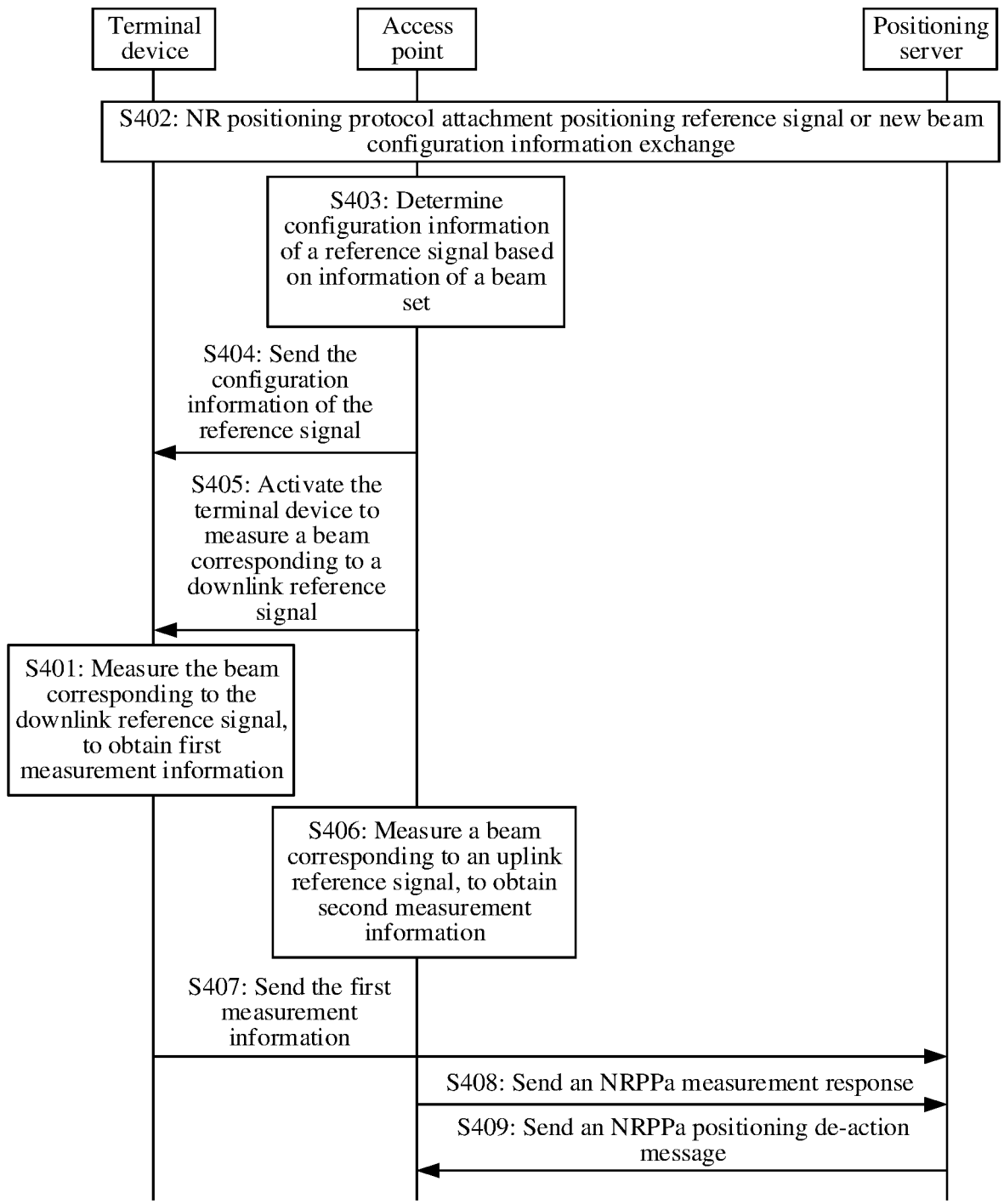
FIG. 4 is a schematic application diagram of a beam management method according to an embodiment.

FIG. 4 is a schematic application diagram of a beam management method according to an embodiment.

For example, with reference to S401 in FIG. 4, the terminal device may measure the beam corresponding to the downlink reference signal (DL RS), to obtain the first measurement information. The first measurement information may include a measurement result related to a cell serving the first measurement information (for example, the RIS serving the first measurement information). For example, the first measurement information may include, but is not limited to, one or more of the following items: strength of reference signals received on different beams in the beam set, time of arrival of the received reference signals, and channel information on different subcarriers.

In some embodiments, the beam set is a subset of a first set, and the first set may include all beams between the RIS and the terminal device.

Figure 5:
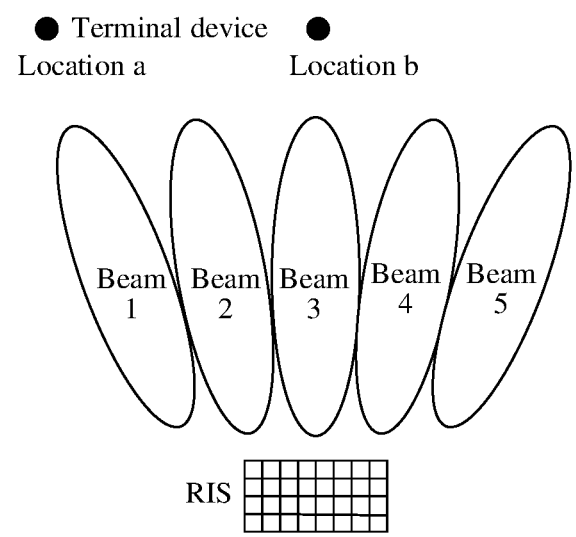
FIG. 5 is a schematic diagram of a beam set according to an embodiment.

FIG. 5 is a schematic diagram of a beam set according to an embodiment. With reference to FIG. 5, there are five beams between the RIS and the terminal device: a beam 1 to a beam 5. Assuming that the location of the terminal device is a location a shown in FIG. 5, the beam set may include the beam 1 to the beam 3 (for example, determined based on a gain of the beam). Assuming that the location of the terminal device is a location b shown in FIG. 5, the beam set may include the beam 2 to the beam 4.

In this way, the beam set is the subset of the first set, so that efficiency of measuring the beam corresponding to the downlink reference signal by the terminal device may be improved, beam alignment time may be shortened, and a used system resource or overhead ratio is reduced.

In some embodiments, S301 may include: The terminal device determines the first measurement information based on the information of the beam set and resource information.

Optionally, the resource information may include a time frequency resource and slot indication information, and the slot indication information may indicate a slot for measuring an uplink reference signal and/or the downlink reference signal.

In other words, the terminal device may perform, based on the resource information used for beam management and the information, about the beam set, used for beam management, beam scanning on the beam corresponding to the downlink reference signal, to obtain beam measurement information.

In some embodiments, the beam management method may further include the following step.

S301b: The positioning server sends the information of the beam set. Correspondingly, the access point receives the information of the beam set from the positioning server, the RIS receives the information of the beam set, and the terminal device receives the information of the beam set.

Optionally, that the positioning server sends the information of the beam set may include: The positioning server sends the information of the beam set to the access point, or the positioning server transparently transmits the information of the beam set to the terminal device through the access point, or the positioning server transparently transmits the information of the beam set to the terminal device through the access point and the RIS, or the positioning server transparently transmits the information of the beam set to the RIS through the access point, or the positioning server sends the information of the beam set to the RIS.

Alternatively, optionally, the information of the beam set may be configured for the terminal device or the RIS in a non-transparent transmission manner.

For example, the positioning server sends a first message to the access point, where the first message includes the information of the beam set. The access point sends a second message to the terminal device, where the second message includes the information of the beam set, and the second message may further include other information (for example, the resource information). An implementation of configuring the information of the beam set for the RIS in the non-transparent transmission manner is similar to this implementation. Details are not described herein again.

Optionally, that the RIS receives the information of the beam set may include: The RIS receives the information of the beam set from the access point, or the RIS receives the information of the beam set from the positioning server.

Optionally, that the terminal device receives the information of the beam set may include: The terminal device receives the information of the beam set from the access point, or the terminal device receives the information of the beam set from the positioning server, or the terminal device receives the information of the beam set from the RIS.

In this way, the information of the beam set may be configured for the access point, the RIS, and the terminal device, to perform beam management.

With reference to FIG. 4, S301b may be completed in an NR positioning protocol attachment (NRPPa) positioning reference signal (PRS) or a new beam (NewBM) configuration information exchange (NRPPa PRS/NewBM configuration information exchange) process in S402.

In some embodiments, the beam management method provided may further include the following step.

S301c: The positioning server sends the resource information. Correspondingly, the access point receives the resource information from the positioning server, the RIS receives the resource information, and the terminal device receives the resource information.

Optionally, that the positioning server sends the resource information may include: The positioning server sends the resource information to the access point, or the positioning server transparently transmits the resource information to the terminal device through the access point, or the positioning server transparently transmits the resource information to the terminal device through the access point and the RIS, or the positioning server transparently transmits the resource information to the RIS through the access point, or the positioning server sends the resource information to the RIS.

Alternatively, optionally, the resource information may be configured for the terminal device or the RIS in a non-transparent transmission manner. A specific implementation is similar to the foregoing implementation of configuring the resource information for the terminal device or the RIS in the non-transparent transmission manner. Details are not described herein again.

Optionally, that the RIS receives the resource information may include: The RIS receives the resource information from the access point, or the RIS receives the resource information from the positioning server.

Optionally, that the terminal device receives the resource information may include: The terminal device receives the resource information from the access point, or the terminal device receives the resource information from the positioning server, or the terminal device receives the resource information from the RIS.

In this way, the resource information may be configured for the access point, the RIS, and the terminal device, to perform beam management.

With reference to FIG. 4, S301c may be completed in a process of S402 shown in FIG. 4.

It should be noted that a sequence of S301b and S301c is not limited in this embodiment. For example, S301b and S301c may be performed in a same step, and the positioning server sends the information of the beam set and the resource information.

For example, with reference to FIG. 4, the beam management method provided in this embodiment may further include S403 to S405.

S403: The access point determines configuration information of a reference signal based on the information of the beam set.

Optionally, the configuration information of the reference signal includes, but is not limited to, one or more of the following items: transmission time information of the reference signal, information of a resource occupied by the reference signal in frequency domain, and a transmission period of the reference signal.

Optionally, the access point may determine the configuration information of the reference signal based on the information of the beam set and the resource information.

S404: The access point sends the configuration information of the reference signal to the terminal device.

S405: The access point activates the terminal device to measure the beam corresponding to the downlink reference signal.

In this way, the terminal device may measure the beam corresponding to the downlink reference signal, to obtain the first measurement information.

It should be noted that S403 to S405 may be performed before S401.

S302: The access point obtains second measurement information based on the information of the beam set.

For a specific implementation of the beam set, refer to S301. Details are not described herein again.

In some embodiments, the second measurement information may include information determined by the access point based on a beam corresponding to the uplink reference signal.

For example, with reference to S406 in FIG. 4, the access point may measure the beam corresponding to the uplink reference signal (UL RS), to obtain the second measurement information. For example, the second measurement information may include, but is not limited to, one or more of the following items: strength of reference signals received on different beams in the beam set, time of arrival of the received reference signals, and channel information on different subcarriers.

In some embodiments, S302 may include: The access point obtains the second measurement information based on the information of the beam set and the resource information.

For a specific implementation of the resource information, refer to S301. Details are not described herein again.

In other words, the access point may perform, based on the resource information used for beam management and the information, about the beam set, used for beam management, beam scanning on the beam corresponding to the uplink reference signal, to obtain the beam measurement information.

It should be noted that a sequence of S301 and S302 is not limited in this embodiment.

S303: The terminal device sends the first measurement information. Correspondingly, the access point receives the first measurement information, and the positioning server receives the first measurement information.

In other words, the terminal device may feed back the first measurement information to the access point or the positioning server, to determine the beam used for communication between the RIS and the terminal device.

Optionally, S303 may include: The terminal device sends the first measurement information to the access point. Correspondingly, the access point receives the first measurement information from the terminal device.

Optionally, S303 may include: The terminal device transparently transmits the first measurement information to the positioning server through the access point. Correspondingly, the access point receives the first measurement information from the terminal device.

Alternatively, optionally, the terminal device may send the first measurement information to the positioning server in a non-transparent transmission manner.

For example, the terminal device sends a third message to the access point, where the third message includes the first measurement information. The access point sends a fourth message to the positioning server, where the fourth message includes the first measurement information, and the fourth message may further include other information (for example, the second measurement information).

Optionally, that the positioning server receives the first measurement information may include: The positioning server receives the first measurement information from the terminal device, or the positioning server receives the first measurement information from the access point.

With reference to S407 in FIG. 4, the terminal device may send the first measurement information to the positioning server by using a lightweight presentation protocol (LPP).

It should be noted that a sequence of S301, S302, and S303 is not limited in this embodiment.

S304: The access point sends the second measurement information to the positioning server. Correspondingly, the positioning server receives the second measurement information from the access point.

In other words, the access point may feed back the second measurement information to the positioning server, to determine the beam used for communication between the RIS and the terminal device.

For example, with reference to S408 in FIG. 4, the access point may send an NRPPa measurement response to the positioning server. Correspondingly, the positioning server receives the NRPPa measurement response. The NRPPa measurement response includes the second measurement information.

Optionally, the NRPPa measurement response may further include the first measurement information. In this way, sending the first measurement information to the positioning server and sending the second measurement information to the positioning server may be performed in a same step, so that resources may be saved.

It should be noted that a sequence of S301, S303, S302, and 304 is not limited in this embodiment. For example, S302 and S304 may be performed first, and then S301 and S303 are performed. Alternatively, S302 and S301 are performed first, and then S303 and S304 are performed. Alternatively, S301 and S302 are performed first, and then S303 and S304 are performed.

S305: The positioning server determines information of a first beam based on the first measurement information and the second measurement information.

For example, the first beam is a beam in the beam set.

With reference to FIG. 5, assuming that the beam set may include a beam 1 to a beam 3, and the first beam may be one of the beam 1, the beam 2, and the beam 3. For example, the first beam may be the beam 1.

In this way, the positioning server may start a beam management process, to implement beam management between the RIS and the terminal device.

For example, beam management may be performed based on a first criterion, where the first criterion may include cell coverage performance or performance of a terminal device group, and the terminal device group includes one or more terminal devices. In this way, the cell coverage performance or the performance of the terminal device may be improved.

In a possible embodiment, the beam management method provided in this embodiment may further include the following step.

S305a: The positioning server determines second location information of the terminal device based on the first measurement information and the second measurement information.

Optionally, precision of the second location information is higher than precision of the first location information.

Figure 8:
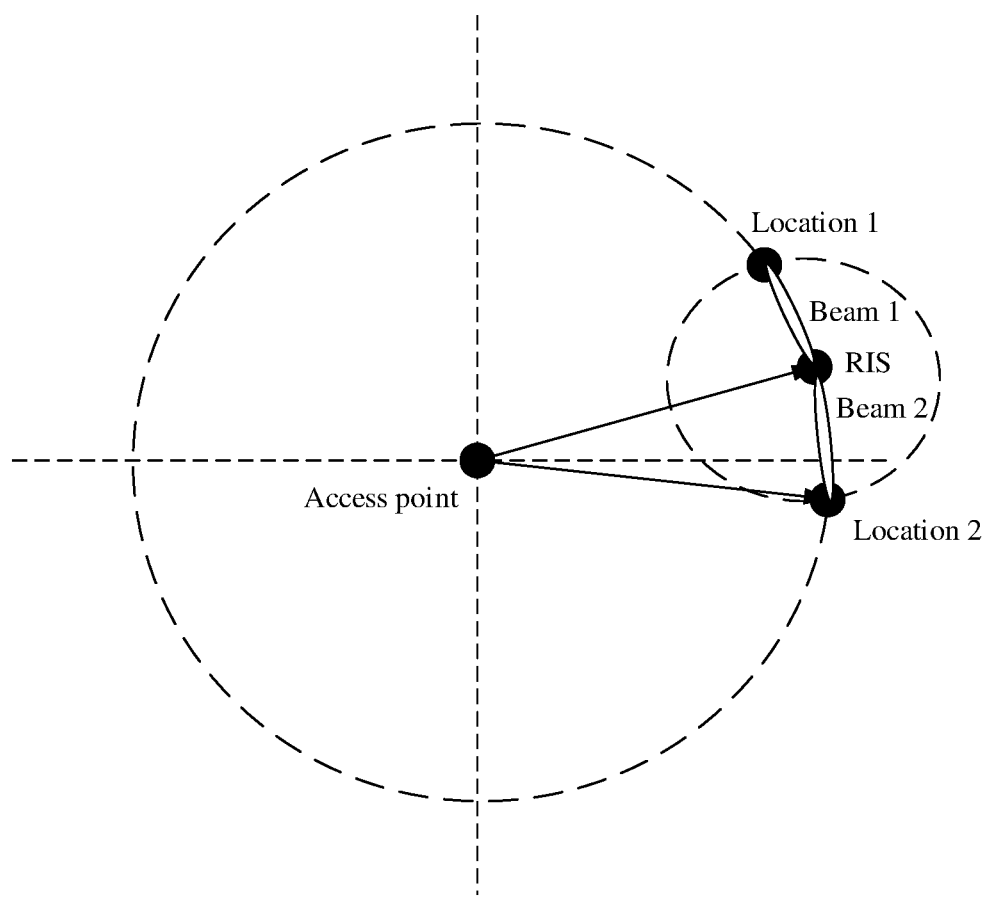
FIG. 8 is a schematic diagram of a type of location information according to an embodiment.

For a specific example, refer to the following descriptions in S605 with reference to FIG. 8. Details are not described herein again.

In other words, location information of the terminal device may be optimized by using measurement data of the beam between the RIS and the terminal device, and precision of the optimized location information of the terminal device is higher than the precision of the first location information. In this way, positioning precision of the terminal device may be improved.

S306: The positioning server sends the information of the first beam. Correspondingly, the access point receives the information of the first beam, the RIS receives the information of the first beam, and the terminal device receives the information of the first beam.

Optionally, that the positioning server sends the information of the first beam may include: The positioning server sends the information of the first beam to the access point, or the positioning server transparently transmits the information of the first beam to the terminal device through the access point, or the positioning server transparently transmits the information of the first beam to the terminal device through the access point and the RIS, or the positioning server transparently transmits the information of the first beam to the RIS through the access point, or the positioning server sends the information of the first beam to the RIS.

Alternatively, optionally, the information of the first beam may be configured for the terminal device or the RIS in a non-transparent transmission manner. A specific implementation is similar to the foregoing implementation of configuring the resource information for the terminal device or the RIS in the non-transparent transmission manner. Details are not described herein again.

Optionally, that the RIS receives the information of the first beam may include: The RIS receives the information of the first beam from the access point, or the RIS receives the information of the first beam from the positioning server.

Optionally, that the terminal device receives the information of the first beam may include: The terminal device receives the information of the first beam from the access point, or the terminal device receives the information of the first beam from the positioning server, or the terminal device receives the information of the first beam from the RIS.

In this way, the information of the first beam may be configured for the RIS and the terminal device, so that the RIS communicates with the terminal device.

For example, the information of the first beam may not be sent to the terminal device. For example, if there is only one terminal device in the coverage of the RIS, the information of the first beam may not be sent to the terminal device, and the RIS communicates with the terminal device through the first beam by default. In this way, resources may be saved.

S307: The RIS communicates with the terminal device through the first beam.

For example, the RIS sends downlink data (or referred to as information, a message, signaling, or the like) to the terminal device through the first beam, and the terminal device may send uplink data to the RIS through the first beam.

In some embodiments, the beam management method provided in this embodiment may further include: The positioning server sends de-action indication information. Correspondingly, the access point receives the de-action indication message from the positioning server, and the terminal device receives the de-action indication message.

Optionally, that the positioning server sends the de-action indication information may include: The positioning server sends the de-action indication information to the access point; or the positioning server transparently transmits the de-action indication information to the terminal device through the access point.

Alternatively, optionally, the de-action indication information may be configured for the terminal device in a non-transparent transmission manner. A specific implementation is similar to the foregoing implementation of configuring the resource information for the terminal device or the RIS in the non-transparent transmission manner. Details are not described herein again.

Optionally, that the terminal device receives the de-action indication information may include: The terminal device receives the de-action indication information from the access point, or the terminal device receives the de-action indication information from the positioning server.

For example, the de-action indication information may indicate to de-action measuring the beam corresponding to the downlink reference signal and/or the beam corresponding to the uplink reference signal.

In this way, after beam management is completed, the access point device may be indicated to stop determining the second measurement information, and the terminal device may be indicated to stop obtaining the first measurement information.

With reference to S409 in FIG. 4, the positioning server sends an NRPPa positioning de-action message to the access point. Correspondingly, the access point receives the NRPPa positioning de-action message from the positioning server. The NRPPa positioning de-action message includes the de-action indication information, to indicate the access point to stop measuring the beam corresponding to the downlink reference signal. The access point sends the de-action indication information to the terminal device, to indicate the terminal device to stop measuring the beam corresponding to the uplink reference signal.

In the beam management method, the positioning server determines the information of the first beam in the beam set based on the first measurement information determined by the terminal device based on the beam corresponding to the downlink reference signal and the second measurement information determined by the access point based on the beam corresponding to the uplink reference signal, where the beam set is determined based on the first location information of the terminal device; and the terminal device communicates with the RIS through the first beam. In this way, a beam management procedure between the RIS and the terminal device may be optimized, and there is no need to perform complex measurement, so that beam management efficiency may be improved, and system overheads may be reduced.

Figure 6:
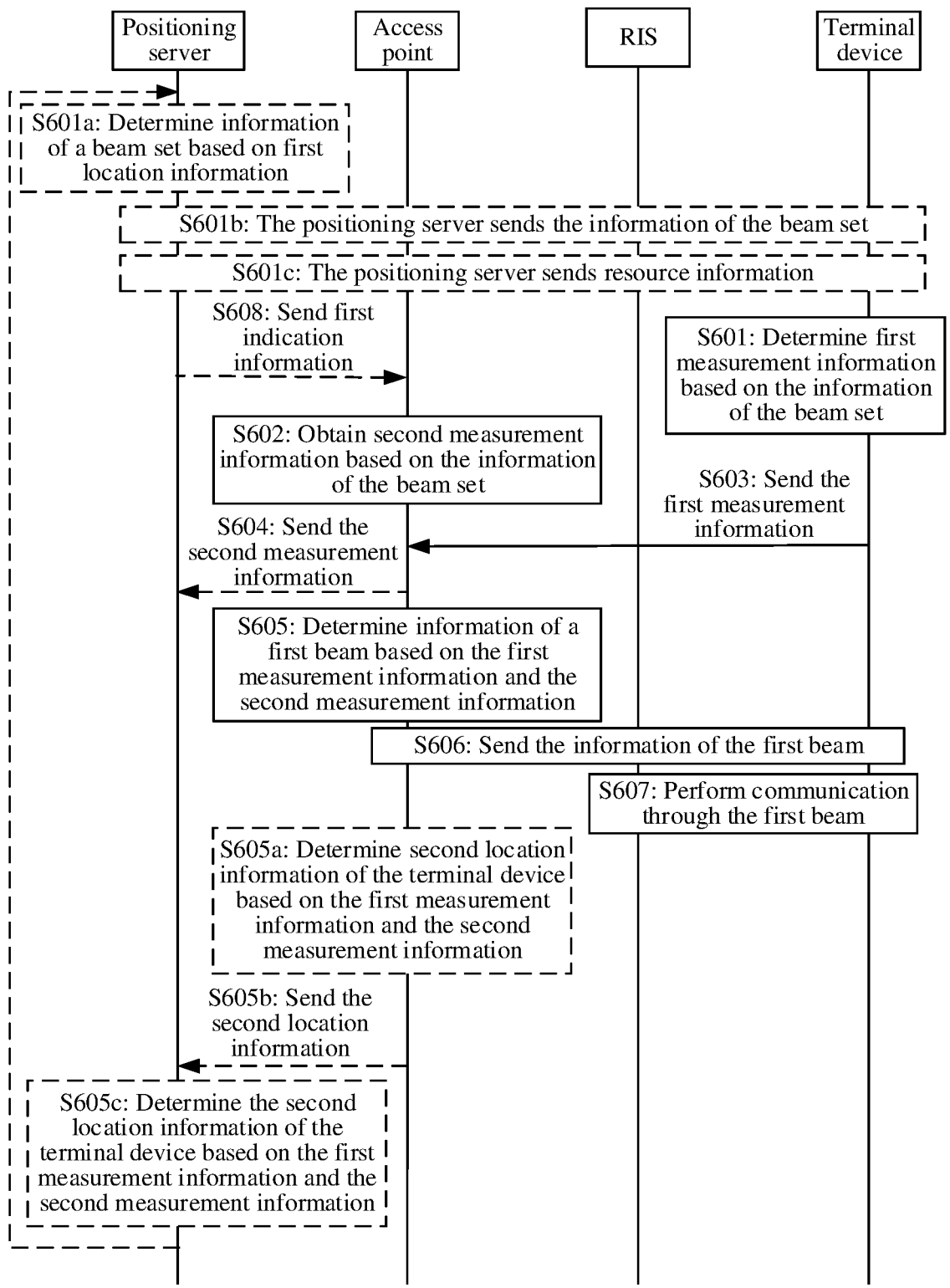
FIG. 6 is a schematic flowchart of another beam management method according to an embodiment.

For example, FIG. 6 is a schematic flowchart of another beam management method according to an embodiment. The beam management method is applicable to communication between any two nodes shown in FIG. 1.

In the beam management method shown in FIG. 6, a dynamic spatial beamforming transmission manner is used. In the transmission manner, an access point jointly works with a RIS to implement dynamic beamforming of a terminal device, a state change period of the RIS is short, and the access point performs beam management between the RIS and the terminal device, so that data of the terminal device may be transmitted in short time and at a high speed.

It should be noted that, before beam management is performed, a beam management policy may be selected. For example, a beam management procedure (corresponding to the method shown in FIG. 3) is completed based on a positioning server, or a beam management procedure (corresponding to the method shown in FIG. 6) is completed based on the access point. For example, if the terminal device is in a stationary state or is in a moving state but moves at a quite slow speed, the terminal device may choose to complete the beam management procedure based on the positioning server. For another example, if the terminal device is in a fast moving state and has a high transmission rate requirement, the terminal device may choose to complete the beam management procedure based on the access point, to implement low-delay, high-speed, and reliable data transmission.

For example, if a user is stationary or moves slowly, beam management of the RIS this time may be completed based on the positioning server on a network side. If a user moves quickly, and a high transmission rate requirement is required, the beam management procedure based on the access point is required to be implemented, to implement low-delay, high-speed, and reliable data transmission.

As shown in FIG. 6, the beam management method includes the following steps.

S601: The terminal device determines first measurement information based on information of a beam set.

For specific implementations of the beam set, first location information, and resource information, refer to S301. Details are not described herein again.

In some embodiments, the beam management method provided in this embodiment may further include S601*a*, S601*b*, and S601*c*. Implementations of S601*a*, S601*b*, and S601*c* are respectively the same as those of S301*a*, S301*b*, and S301*c*. Details are not described herein again.

Figure 7:
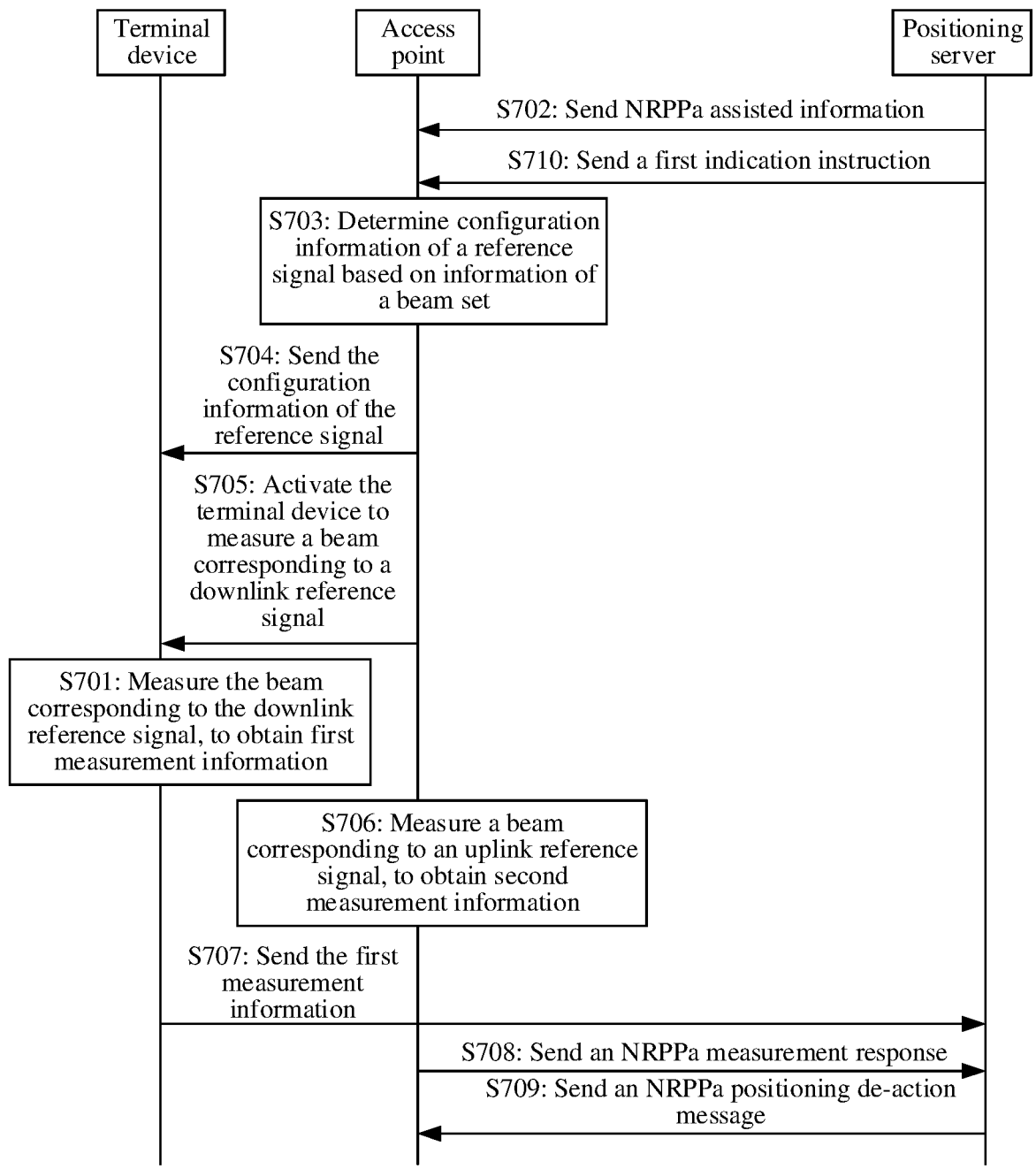
FIG. 7 is a schematic application diagram of another beam management method according to an embodiment.

FIG. 7 is a schematic application diagram of a beam management method according to an embodiment. With reference to S701 in FIG. 7, the terminal device may measure a beam corresponding to a downlink reference signal, to obtain the first measurement information. A specific implementation of S701 in FIG. 7 is the same as that of S401. Details are not described herein again.

With reference to S702 in FIG. 7, the positioning server may send NRPPa assisted information to the access point, where the NRPPa assisted information may include the information of the beam set.

For example, with reference to FIG. 7, the beam management method provided in this embodiment may further include S703 to S705. It should be noted that S703 to S705 are respectively the same as S403 to S405. Details are not described herein again.

In some embodiments, the resource information may be determined by the access point.

In some embodiments, the resource information may be determined by the access point based on the NRPPa assisted information.

Optionally, as shown in S702 in FIG. 7, the NRPPa assisted information may be sent by the positioning server to the access point. In combination, the NRPPa assisted information may further include assisted data of an observed time difference of arrival (OTDOA).

S602: The access point obtains second measurement information based on the information of the beam set.

It should be noted that a specific implementation of S602 is the same as that of S302. Details are not described herein again.

For example, with reference to S706 in FIG. 7, the access point may measure a beam corresponding to an uplink reference signal, to obtain the second measurement information.

It should be noted that a sequence of S601 and S602 is not limited in this embodiment.

S603: The terminal device sends the first measurement information to the access point. Correspondingly, the access point receives the first measurement information. Optionally, the positioning server receives the first measurement information.

It should be noted that a specific implementation of S603 is the same as that of S303. Details are not described herein again.

For example, the terminal device may feed back the first measurement information to the positioning server, so that the positioning server optimizes location information of the terminal device.

With reference to S707 in FIG. 7, the terminal device may send the first measurement information to the positioning server by using an LPP protocol.

It should be noted that a sequence of S601, S602, and S603 is not limited in this embodiment.

S604: The access point sends the second measurement information to the positioning server. Correspondingly, the positioning server receives the second measurement information from the access point.

For example, the access point may feed back the second measurement information to the positioning server, so that the positioning server optimizes the location information of the terminal device.

Optionally, S304 may be an optional step.

For example, with reference to S708 in FIG. 7, the access point may send an NRPPa measurement response to the positioning server. Correspondingly, the positioning server receives the NRPPa measurement response. The NRPPa measurement response may include the second measurement information.

Optionally, the NRPPa measurement response may further include the first measurement information. In this way, sending the first measurement information to the positioning server and sending the second measurement information to the positioning server may be performed in a same step, so that resources may be saved.

It should be noted that a sequence of S601, S603, S602, and S604 is not limited in this embodiment. For example, S602 and S604 may be sequentially performed first, and then S601 and S603 are sequentially performed. Alternatively, S602 and S601 are sequentially performed first, and then S603 and S604 are sequentially performed. Alternatively, S601 and S602 are sequentially performed first, and then S603 and S604 are sequentially performed.

S605: The access point determines information of a first beam based on the first measurement information and the second measurement information.

For specific implementations of the first measurement information and the second measurement information, refer to the foregoing steps S301 and S302. Details are not described herein again.

For example, the first beam is a beam in the beam set.

With reference to FIG. 5, assuming that the beam set may include a beam 1 to a beam 3, and the first beam may be one of the beam 1, the beam 2, and the beam 3. For example, the first beam may be the beam 1.

In this way, the access point may start a beam management process, to implement beam management between the RIS and the terminal device, and determine an optimal beam used for data transmission between the terminal device and the RIS.

For example, beam management may be performed based on a first criterion, where the first criterion may include cell coverage performance or performance of a terminal device group, and the terminal device group includes one or more terminal devices. In this way, the cell coverage performance or the performance of the terminal device may be improved.

In a possible embodiment, the beam management method provided in this embodiment may further include S605a to S606b.

S605a: The access point determines second location information of the terminal device based on the first measurement information and the second measurement information.

Optionally, precision of the second location information is higher than precision of the first location information.

In other words, the location information of the terminal device may be optimized by using measurement data of the beam between the RIS and the terminal device, and precision of the optimized location information of the terminal device is higher than the precision of the first location information. In this way, positioning precision of the terminal device may be improved.

S605b: The access point sends the second location information to the positioning server. Correspondingly, the positioning server receives the second location information from the access point.

In other words, the access point may feed back the optimized location information to the positioning server.

In another possible embodiment, the location information of the terminal device may be optimized by the positioning server. The beam management method provided in this embodiment may further include the following step.

S605c: The positioning server determines the second location information of the terminal device based on the first measurement information and the second measurement information.

For a specific implementation of S605c, refer to S305a. Details are not described herein again.

It should be noted that a sequence of S605, and S605a and S605b is not limited in this embodiment, and a sequence of S605 and S605c is not limited.

With reference to FIG. 8, that the first location information includes information of two locations is used as an example. For example, the first location information includes information of a location 1 and information of a location 2. The positioning server configures a beam set (which includes a beam 1 shown in FIG. 8, and may further include another beam, not shown in FIG. 8) for the location 1, and configures a beam set (which includes a beam 2 shown in FIG. 8, and may further include another beam, not shown in FIG. 8) for the location 2.

The positioning server or the access point may update the location information of the terminal device based on a result of measuring the received downlink reference signal by the terminal device. For example, energy of receiving, by the terminal device, a downlink reference signal transmitted based on the beam 2 is far greater than energy of receiving, by the terminal device, a downlink reference signal transmitted based on the beam 1, so that the terminal device may communicate with the RIS through the beam 2. In addition, direction information between the RIS and the terminal device may be determined based on the beam 2, so that it may be determined that a true location of the terminal device is the location 2, to improve precision of the location of the terminal device.

It should be noted that, improvement of the positioning precision may be implemented by combining data obtained by using a plurality of measurement standards. For example, after the data is separately obtained in a positioning manner based on a time difference of arrival of a signal and a positioning manner based on directionality of an angle of arrival, integration processing is performed on the data obtained in the two positioning manners, to obtain high-precision location information of the terminal device. For another example, user positioning precision is improved by integrating a solution of combining relative positioning data and global positioning data.

In some implementations, the second location information may be used as the first location information, to perform S601a, and the positioning server determines the information of the beam set based on the first location information.

In other words, after obtaining the second location information with higher precision, the positioning server may determine the information of the beam set based on the second location information, so that information of a better first beam may be determined, good data transmission between the terminal device and the RIS may be maintained, and robust transmission may be implemented.

S606: The access point sends the information of the first beam. Correspondingly, the RIS receives the information of the first beam, and the terminal device receives the information of the first beam.

Optionally, that the access point sends the information of the first beam may include: The access point transparently transmits the information of the first beam to the terminal device through the RIS, or the positioning server sends the information of the first beam to the terminal device, or the access point sends the information of the first beam to the RIS.

Optionally, that the terminal device receives the information of the first beam may include: The terminal device receives the information of the first beam from the access point, or the terminal device receives the information of the first beam from the RIS.

In this way, the information of the first beam may be configured for the RIS and the terminal device, so that the RIS communicates with the terminal device.

For example, the information of the first beam may not be sent to the terminal device. For example, if there is only one terminal device in coverage of the RIS, the information of the first beam may not be sent to the terminal device, and the RIS communicates with the terminal device through the first beam by default. In this way, resources may be saved.

S607: The RIS communicates with the terminal device through the first beam.

For a specific implementation of S607, refer to S307. Details are not described herein again.

It should be noted that a sequence of S606 and S607, and S605a and S605b is not limited in this embodiment, and a sequence of S606 and S607, and S605c is not limited.

In a possible embodiment, the beam management method provided in this embodiment may further include the following step.

S608: The positioning server sends first indication information to the access point. Correspondingly, the access point receives the first indication information from the positioning server.

Optionally, the first indication information indicates determining of the information of the first beam that may be enabled or disabled by the access point.

For example, with reference to S710 in FIG. 7, the positioning server sends a first indication instruction to the access point. Correspondingly, the access point receives the first indication instruction from the positioning server. It should be noted that S710 may be performed before S703.

Optionally, the first indication instruction includes the first indication information. For example, the first indication instruction may be an NRPPa positioning pending instruction.

It should be noted that S608 may be performed before S601, to start a dynamic beam management procedure based on the access point, and the access point manages the beam between the RIS and the terminal device.

In a possible embodiment, the beam management method provided in this embodiment may further include: The access point sends a request message to the positioning server. Correspondingly, the positioning server receives the request message from the access point.

Optionally, the request message may be used by the access point to request to determine the information of the first beam.

In other words, the access point may apply for the dynamic beam management procedure based on the access point, to apply for beam management between the RIS and the terminal device.

In a possible embodiment, the beam management method provided in this embodiment may further include: The positioning server sends a response message to the access point. Correspondingly, the access point receives the response message from the positioning server.

Optionally, the response message may indicate whether the access point is allowed to determine the information of the first beam.

Optionally, the response message may be sent after the positioning server receives the request message. Alternatively, the response message may be sent by the positioning server after the positioning server performs determining. In other words, the access point may not need to make a request, and the positioning server directly determines that the access point performs beam management between the RIS and the terminal device.

For example, the response message may indicate that the access point is determined to perform the dynamic beam management procedure. Alternatively, the response message may indicate that the access point is not allowed to perform the dynamic beam management procedure.

It should be noted that, that the access point sends the request message to the positioning server and that the positioning serve sends the response message to the access point may be performed before S608.

In a possible embodiment, the beam management method shown in FIG. 6 may be cyclically performed.

For example, for a terminal device in a moving state, the beam management method shown in FIG. 6 may be cyclically performed until data transmission of the terminal device ends, so that continuous beam tracking and alignment may be performed on the terminal device, to implement stable data transmission.

For example, in a process of cyclically performing the beam management method shown in FIG. 6, second location information determined last time may be used as first location information for a next time, to perform S601a, and the positioning server determines the information of the beam set based on the first location information, so that the information of the better first beam may be determined.

In some embodiments, the beam management method provided in this embodiment may further include: The positioning server sends de-action indication information. Correspondingly, the access point receives the de-action indication message from the positioning server, and the terminal device receives the de-action indication message. For a specific implementation, refer to the corresponding implementation in S307. Details are not described herein again.

With reference to S709 in FIG. 7, the positioning server sends an NRPPa positioning de-action message to the access point. Correspondingly, the access point receives the NRPPa positioning de-action message from the positioning server. The NRPPa positioning de-action message includes the de-action indication information. Refer to S409. Details are not described herein again.

For example, after data transmission of the terminal device ends, the positioning server may send the de-action indication information, so that the positioning procedure may be stopped.

In the beam management method, the access point determines the information of the first beam in the beam set based on the first measurement information determined by the terminal device based on the beam corresponding to the downlink reference signal and the second measurement information determined by the access point based on the beam corresponding to the uplink reference signal, where the beam set is determined based on the first location information of the terminal device; and the terminal device communicates with the RIS through the first beam. In this way, complex measurement does not need to be performed, and the beam management procedure between the RIS and the terminal device is optimized, so that beam management efficiency may be improved, and system overheads may be reduced.

Figure 9:
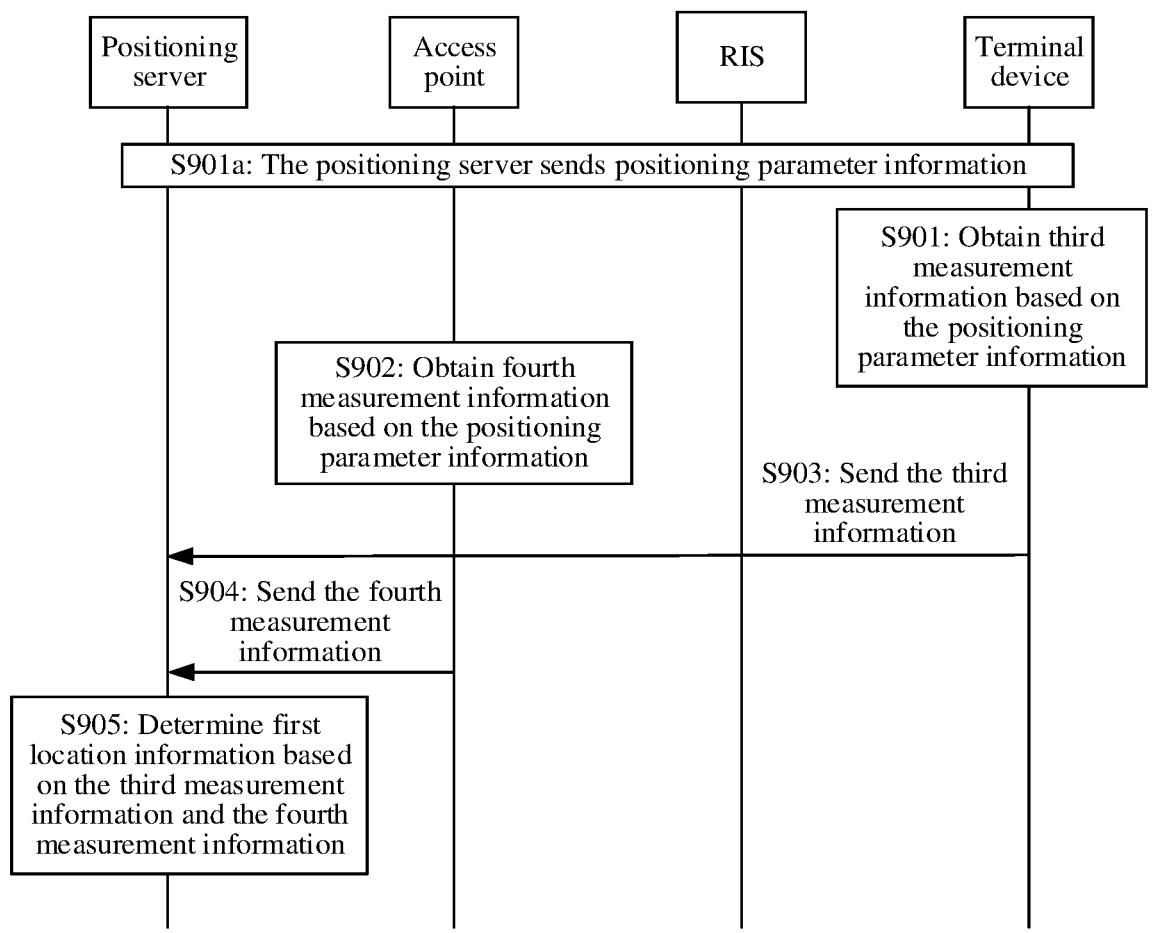
FIG. 9 is a schematic flowchart of still another beam management method according to an embodiment.

FIG. 9 is a schematic flowchart of still another beam management method according to an embodiment.

The following describes, with reference to FIG. 9, that a positioning server determines first location information of a terminal device. The method shown in FIG. 9 is in a static positioning phase, and an idle resource of a system may be used. The beam management method shown in FIG. 9 may be used in combination with the beam management method shown in FIG. 3 or FIG. 6. For example, the beam management method shown in FIG. 9 may be performed before the beam management method shown in FIG. 3 or FIG. 6.

It should be noted that, when the beam management method shown in FIG. 9 is used in combination with the beam management method shown in FIG. 6, that an access point sends a request message to the positioning server and that the positioning server sends a response message to the access point may be performed before S901.

As shown in FIG. 9, the beam management method includes the following steps.

S901: The terminal device obtains third measurement information based on positioning parameter information.

Optionally, the positioning parameter information may include one or more of the following items: location information of a RIS, an identifier of the access point, and location information of the access point.

Figure 10:
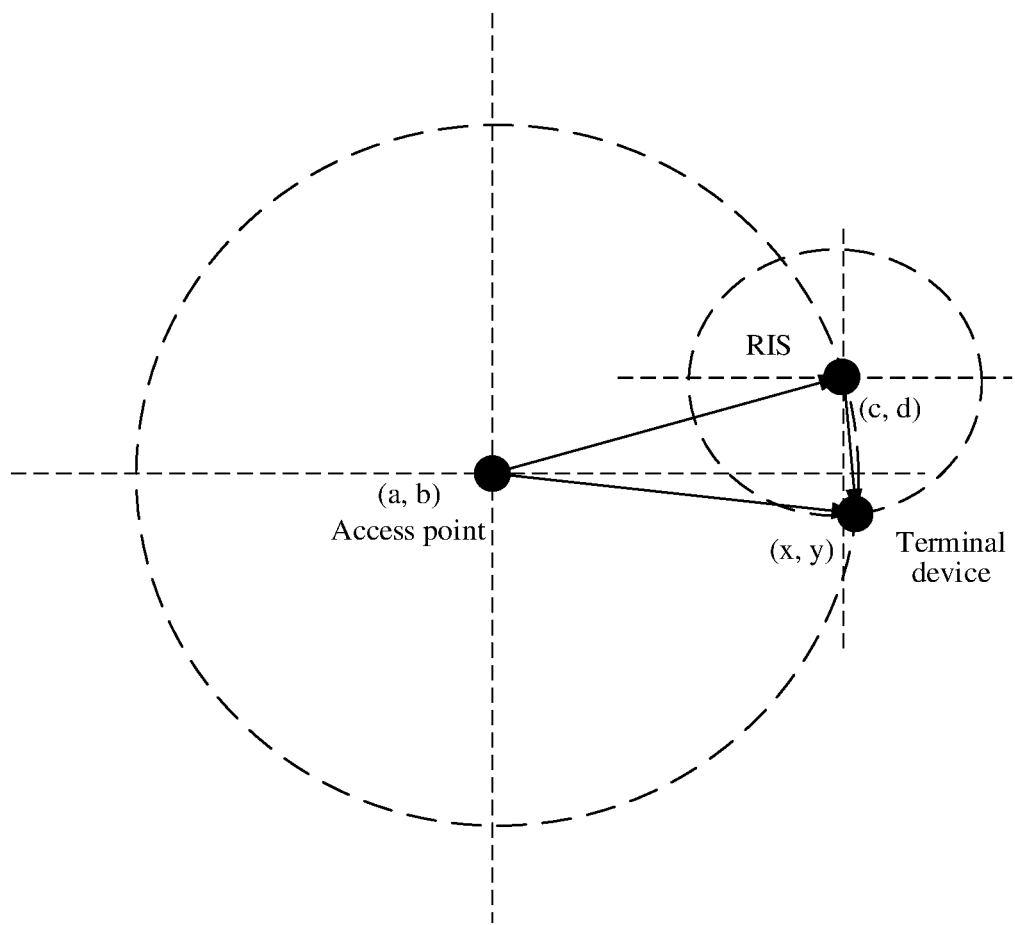
FIG. 10 is a schematic diagram of another type of location information according to an embodiment.

With reference to FIG. 10, an example in which the access point, the RIS, and the terminal device are deployed at a same height is used. The access point is configured with one or more antennas, and the RIS is deployed in coverage of the access point. The location information of the RIS may include coordinates (c, d), and the location information of the access point may include coordinates (a, b).

For example, the access point may include an access point serving the terminal device and/or another access point, for example, an access point of a neighboring cell, or an access point of a non-serving cell in a user tracking or user paging set.

Optionally, the positioning parameter information may further include resource information used for positioning. For example, the resource information used for positioning may include a time frequency resource and slot indication information, and the slot indication information may indicate a slot for measuring an uplink reference signal and/or a downlink reference signal.

In some embodiments, the beam management method provided in this embodiment may further include the following step.

S901a: The positioning server sends the positioning parameter information. Correspondingly, the access point receives the positioning parameter information from the positioning server, the RIS receives the positioning parameter information, and the terminal device receives the positioning parameter information.

Optionally, that the positioning server sends the positioning parameter information may include: The positioning server sends the positioning parameter information to the access point, or the positioning server transparently transmits the positioning parameter information to the terminal device through the access point, or the positioning server transparently transmits the positioning parameter information to the terminal device through the access point and the RIS, or the positioning server transparently transmits the positioning parameter information to the RIS through the access point, or the positioning server sends the positioning parameter information to the RIS.

For example, the access point may send the positioning parameter information to the terminal device, and the access point may send the positioning parameter information to the RIS.

Alternatively, optionally, the positioning parameter information may be configured for the terminal device or the RIS in a non-transparent transmission manner. A specific implementation is similar to the foregoing implementation of configuring the resource information for the terminal device or the RIS in the non-transparent transmission manner. Details are not described herein again.

Optionally, that the RIS receives the positioning parameter information may include: The RIS receives the positioning parameter information from the access point, or the RIS receives the positioning parameter information from the positioning server. Optionally, the RIS may send the positioning parameter information to the terminal device.

Optionally, that the terminal device receives the positioning parameter information may include: The terminal device receives the positioning parameter information from the access point, or the terminal device receives the positioning parameter information from the positioning server, or the terminal device receives the positioning parameter information from the RIS.

In this way, the positioning parameter information may be configured for the access point, the RIS, and the terminal device, to perform beam management.

Figure 11:
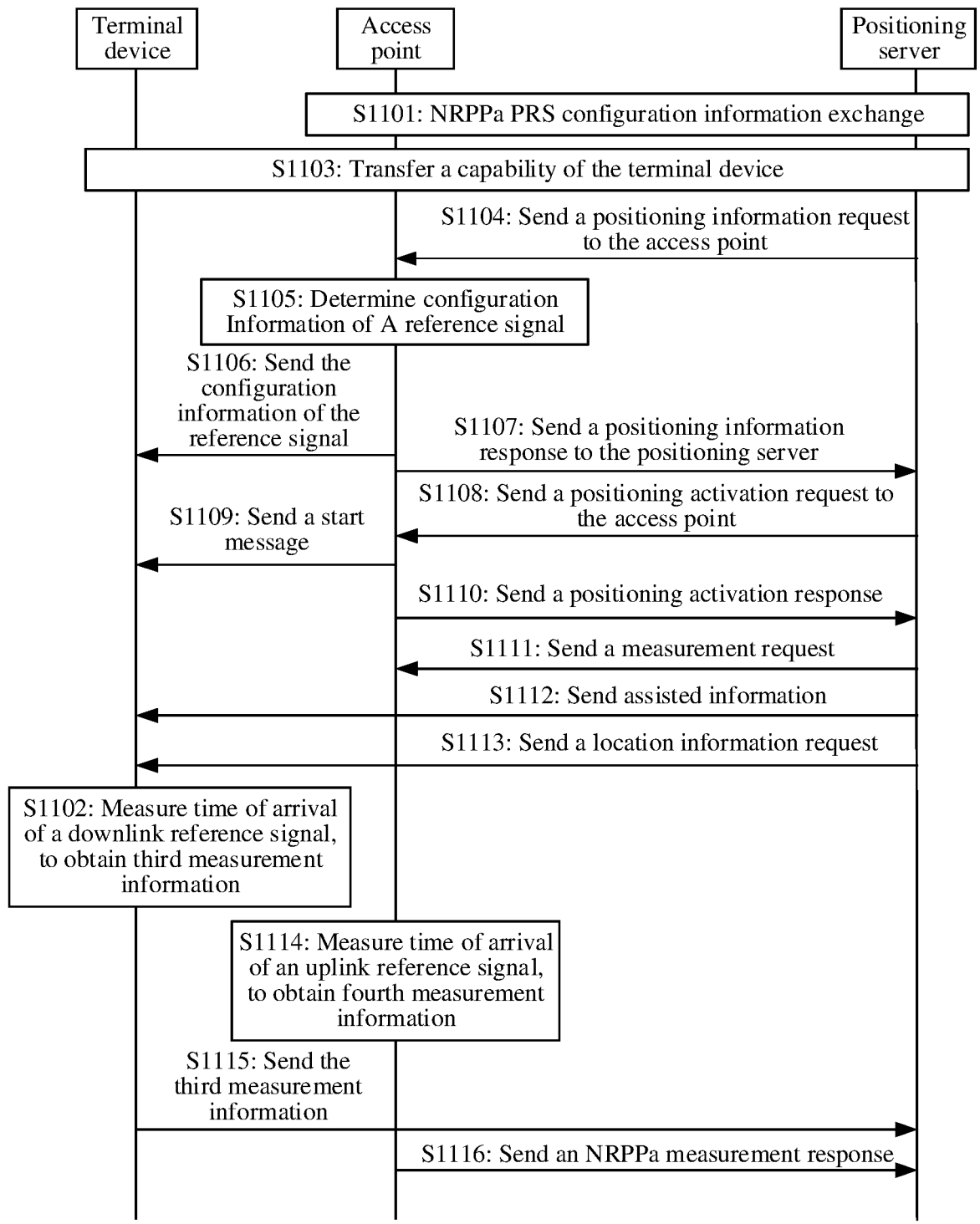
FIG. 11 is a schematic application diagram of still another beam management method according to an embodiment.

FIG. 11 is a schematic application diagram of still another beam management method according to an embodiment.

With reference to FIG. 11, S901a may be completed in an NRPPa PRS configuration information exchange process in S1101.

In some embodiments, the beam management method provided in this embodiment may further include: The RIS sends the location information of the RIS.

Optionally, the RIS may send the location information of the RIS to the positioning server. For example, this may be performed before S901a, so that the positioning server obtains the location information of the RIS.

In some embodiments, the beam management method provided in this embodiment may further include: The access point sends the location information of the access point.

Optionally, the access point may send the location information of the access point to the positioning server. For example, this may be performed before S901a, so that the positioning server obtains the location information of the access point. The access point may further send the identifier of the access point to the positioning server.

It should be noted that specific implementations in which the positioning server, the access point, the RIS, and the terminal device obtain the positioning parameter information are not limited in this embodiment, provided that a positioning parameter can be obtained.

In some embodiments, the third measurement information may include information determined by the terminal device based on time of arrival of the downlink reference signal.

For example, with reference to S1102 in FIG. 11, the terminal device may measure the time of arrival of the downlink reference signal, to obtain the third measurement information.

For example, the third measurement information may include a distance $L_{AU}$ between the access point and the terminal device and a distance $L_{RU}$ between the RIS and the terminal device, a transmission delay $\Delta t_0$ of the downlink reference signal from the access point to the terminal device, a transmission delay $\Delta t_1$ of the downlink reference signal from the RIS to the terminal device, or a transmission delay $\Delta t$ of the downlink reference signal from the access point to the terminal device through the RIS.

Figure 12:
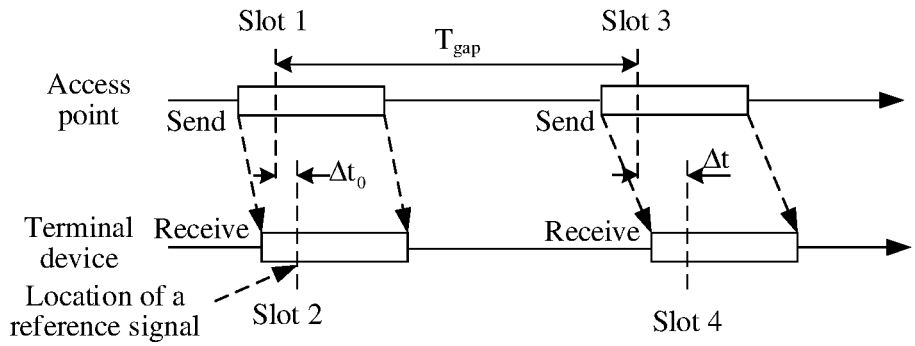
FIG. 12 is a schematic application diagram of still another beam management method according to an embodiment.

With reference to FIG. 12, the access point sends the downlink reference signal in a slot 1, and the terminal device receives the downlink reference signal in a slot 2. A difference between the slot 2 and the slot 1 is the transmission delay $\Delta t_0$ of the downlink reference signal from the access point to the terminal device. After a predetermined time gap $T_{gap}$, the access point sends the downlink reference signal in a slot 3, where the downlink reference signal is transmitted to the terminal device through the RIS; and the terminal device receives the downlink reference signal in a slot 4. A difference between the slot 4 and the slot 3 is the transmission delay $\Delta t$ of the downlink reference signal from the access point to the terminal device through the RIS. Further, the transmission delay $\Delta t_1$ of the downlink reference signal from the RIS to the terminal device may be obtained based on a difference between $\Delta t$ and a transmission delay of the downlink reference signal from the access point to the RIS.

A product of the transmission delay and a speed of light v is a corresponding distance. The distance $L_{AU}$ between the access point and the terminal device may be expressed as the following formula: $L_{AU}=v\times\Delta t_0$. The distance $L_{RU}$ between the RIS and the terminal device may be expressed as the following formula: $L_{RU}=v\times\Delta t_1$.

It should be noted that manners of obtaining the distance $L_{AU}$ between the access point and the terminal device and the distance $L_{RU}$ between the RIS and the terminal device are not limited in this embodiment. For example, the downlink reference signal may be sent for a plurality of times, to obtain a plurality of transmission delays $\Delta t_0$ from the access point to the terminal device and a plurality of transmission delays $\Delta t$ from the access point to the terminal device through the RIS, and then weighted averaging is performed, to obtain a more accurate transmission delay of the terminal device and a plurality of transmission delays from the access point to the terminal device through the RIS.

Optionally, the foregoing obtained downlink reference signal information (for example, the third measurement information) and previously obtained downlink reference signal information may enter data integration processing, to implement optimization processing of calculation of the distance between the access point and the terminal device.

For example, with reference to FIG. 11, the beam management method provided in this embodiment may further include S1103 to S1113.

S1103: Transfer a capability of the terminal device.

The positioning server may request the terminal device to send capability information, and the terminal device may send the capability information of the terminal device.

For example, the capability information of the terminal device may include a capability of an observed time difference of arrival (OTDOA) of the terminal device. The capability information may further include a frequency band supported by the terminal device and whether the terminal device supports inter-frequency measurement.

S1104: The positioning server sends a positioning information request to the access point. Correspondingly, the access point receives the positioning information request from the positioning server.

Optionally, the positioning information request may be used to request the access point to measure time of arrival of the uplink reference signal, and/or request the terminal device to measure the time of arrival of the downlink reference signal.

S1105: The access point determines configuration information of a reference signal.

S1106: The access point sends the configuration information of the reference signal to the terminal device. Correspondingly, the terminal device receives the configuration information of the reference signal from the access point.

S1107: The access point sends a positioning information response to the positioning server. Correspondingly, the positioning server receives the positioning information response from the access point.

Optionally, the positioning information response may indicate that measurement of the time of arrival of the downlink reference signal and measurement of the time of arrival of the uplink reference signal may start to be performed.

S1108: The positioning server sends a positioning activation request to the access point. Correspondingly, the access point receives the positioning activation request from the positioning server.

Optionally, the positioning activation request may indicate the access point to start to measure the time of arrival of the uplink reference signal, and/or the terminal device to start to measure the time of arrival of the downlink reference signal.

S1109: The access point sends a start message to the terminal device. Correspondingly, the terminal device receives the start message from the access point.

Optionally, the start message may indicate the terminal device to start measurement of the time of arrival of the downlink reference signal.

S1110: The access point sends a positioning activation response to the positioning server. Correspondingly, the positioning server receives the positioning activation response from the access point.

Optionally, the positioning activation response may indicate that the access point is ready to start measurement of the time of arrival of the uplink reference signal based on a configuration, and/or the terminal device has started measurement of the time of arrival of the downlink reference signal.

S1111: The positioning server sends a measurement request to the access point. Correspondingly, the access point receives the measurement request from the positioning server.

Optionally, the measurement request may be used to request the access point to start measurement of the positioning information.

S1112: The positioning server sends assisted information to the terminal device. Correspondingly, the terminal device receives the assisted information from the positioning server.

Optionally, the assisted information includes a measurement period, a slot, and the like.

S1113: The positioning server sends a location information request to the terminal device. Correspondingly, the terminal device receives the location information request from the positioning server.

Optionally, the location information request is used to request the third measurement information.

It should be noted that S1103 to S1113 may be performed before S1102.

S902: The access point obtains fourth measurement information based on the positioning parameter information.

In some embodiments, the fourth measurement information may include information determined by the access point based on the time of arrival of the uplink reference signal.

For example, with reference to S1114 in FIG. 11, the access point may measure the time of arrival of the uplink reference signal to obtain the fourth measurement information.

For example, the fourth measurement information may include a distance $L_{AU}$ between the access point and the terminal device and a distance $L_{RU}$ between the RIS and the terminal device, a transmission delay $\Delta t_0$ of the downlink reference signal from the access point to the terminal device, a transmission delay $\Delta t_1$ of the downlink reference signal from the RIS to the terminal device, or a transmission delay $\Delta t$ of the downlink reference signal from the access point to the terminal device through the RIS. A specific implementation is similar to the foregoing descriptions that the terminal device may measure the time of arrival of the downlink reference signal with reference to FIG. 11. Details are not described herein again.

It should be noted that a sequence of S901 and S902 is not limited in this embodiment.

S903: The terminal device sends the third measurement information. Correspondingly, the access point receives the third measurement information, or the positioning server receives the third measurement information.

The terminal device may feed back the third measurement information to the access point or the positioning server, to determine location information of the terminal device.

Optionally, S902 may include: The terminal device sends the third measurement information to the access point. Correspondingly, the access point receives the third measurement information from the terminal device. The access point may send the third measurement information to the positioning server.

Optionally, S902 may include: The terminal device transparently transmits the third measurement information to the positioning server through the access point. Correspondingly, the access point receives the third measurement information from the terminal device.

Alternatively, optionally, the third measurement information may be sent to the positioning server in a non-transparent transmission manner. For a specific implementation, refer to the foregoing implementation in which the terminal device sends the first measurement information to the positioning server in the non-transparent transmission manner. Details are not described herein again.

Optionally, that the positioning server receives the third measurement information may include: The positioning server receives the third measurement information from the terminal device, or the positioning server receives the third measurement information from the access point.

With reference to S1115 in FIG. 11, the terminal device may send the third measurement information to the positioning server by using an LPP protocol.

It should be noted that a sequence of S901, S902, and S903 is not limited in this embodiment.

S904: The access point sends the fourth measurement information to the positioning server. Correspondingly, the positioning server receives the fourth measurement information from the access point.

In this way, the access point may feed back the fourth measurement information to the positioning server, to determine the location information of the terminal device.

For example, with reference to S1116 in FIG. 11, the access point may send an NRPPa measurement response to the positioning server. Correspondingly, the positioning server receives the NRPPa measurement response. The NRPPa measurement response includes the fourth measurement information.

Optionally, the NRPPa measurement response may further include the third measurement information. In this way, sending the third measurement information to the positioning server and sending the fourth measurement information to the positioning server may be performed in a same step, so that resources may be saved.

It should be noted that a sequence of S901, S903, S902, and S904 is not limited in this embodiment. For example, S902 and S904 may be sequentially performed first, and then S901 and S903 are sequentially performed. Alternatively, S902 and S901 are sequentially performed first, and then S903 and S904 are sequentially performed. Alternatively, S901 and S902 are sequentially performed first, and then S903 and S904 are sequentially performed.

The beam management method provided in this embodiment is applicable to a positioning scenario of a plurality of users in coverage of a cell. S1102, and S1104 to S1116 shown in FIG. 11 may be shared for positioning of a plurality of terminal devices in coverage of a same cell, so that system resources may be saved, and a positioning period may be reduced.

S905: The positioning server determines the first location information based on the third measurement information and the fourth measurement information.

For example, the positioning server may determine the first location information of the terminal device with reference to the following formula (1) and formula (2):

$$(x-a)^2+(y-b)^2=L_{AU}^2 \qquad (1)$$

$$(x-c)^2\pm(y-d)^2=L_{RU}^2 \qquad (2)$$

In the foregoing formula (1), the location information of the access point may include coordinates (a, b), and the $L_{AU}$ represents the distance between the access point and the terminal device. In the foregoing formula (2), the $L_{RU}$ represents the distance between the RIS and the terminal device, and the location information of the RIS may include coordinates (c, d).

The distance $L_{AU}$ between the access point and the terminal device may be expressed as the following formula: $L_{AU}=v\times\Delta t_0$. The distance $L_{RU}$ between the RIS and the terminal device may be expressed as the following formula: $L_{RU}=v\times\Delta t_1$. The transmission delay $\Delta t_1$ of the downlink reference signal from the RIS to the terminal device may be expressed as the following formula: $\Delta t_1=\Delta t-L_{AR}/v$.

The following variables $c_1$, $c$, $\xi$, and $Q$ are introduced:

$$c_1 \square Q/(b-d) \qquad (3)$$

$$c \square b-c_1 \qquad (4)$$

$$\xi \square (c-a)/(d-b) \qquad (5)$$

$$Q \square (L_{au}^2-L_{ru}^2 c^2-a^2+d^2-b^2)/2 \qquad (6)$$

In the formula (3), the formula (4), the formula (5), and the formula (6), the mathematical symbol $\square$ represents "being equivalent to".

The coordinates of the terminal device that are obtained by the positioning server are shown in the following formula (7):

$$(x,y) = \left( \frac{(a+\xi e) \pm \sqrt{(a+\xi e)^2 - (1+\xi^2)(a^2+e^2-L_{au}^2)}}{(1+\xi^2)}, -\xi x + e_1 \right) \qquad (7)$$

In some embodiments, the first location information may include information of one or more locations, for example, a location 1 and a location 2 shown in FIG. 8. In this way, the beam set may be determined based on the first location information, to implement beam management between the RIS and the terminal device.

Based on the method shown in FIG. 9, a single access point may be used to position the terminal device. The method is simple, and there is no need to coordinate a plurality of access points to complete positioning of the terminal device, and time synchronization correction is not required for the plurality of access points. The terminal device does not need to detect signals sent by the plurality of access points, so that time synchronization, signal detection, and signal receiving of the access points are omitted, thereby reducing calculation complexity of the terminal device, and reducing power consumption of the terminal device.

The beam management method provided in embodiments is described in detail above with reference to FIG. 3 to FIG.

12. The following describes in detail a beam management apparatus provided in embodiments with reference to FIG. 13 to FIG. 15.

Figure 13:
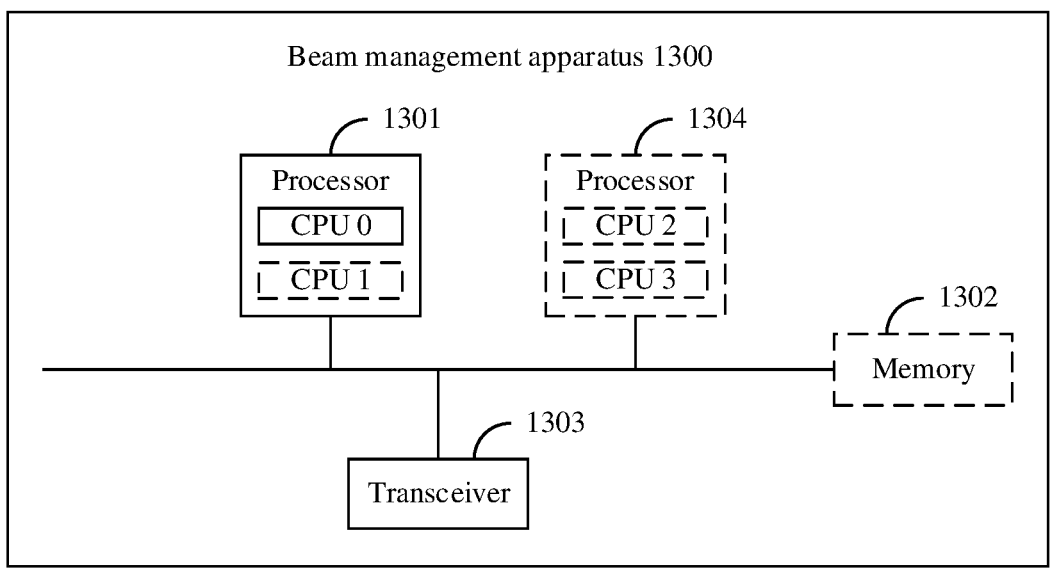
FIG. 13 is a schematic diagram of a structure of a beam management apparatus according to an embodiment.

FIG. 13 is a schematic diagram of a structure of a beam management apparatus that may be configured to perform a beam management method according to an embodiment. The beam management apparatus 1300 may be a terminal device, a positioning server, an access point, or a RIS, or may be a chip used in the terminal device, the positioning server, the access point, or the RIS, or may be another component having a corresponding function. As shown in FIG. 13, the beam management apparatus 1300 may include a processor 1301 and a transceiver 1303. The beam management apparatus 1300 may further include a memory 1302. The processor 1301 is coupled to the memory 1302 and the transceiver 1303, for example, may be connected to the memory 1302 and the transceiver 1303 through a communication bus, or the processor 1301 may be used independently.

The following describes each component of the beam management apparatus 1300 in detail with reference to FIG. 13.

The processor 1301 is a control center of the beam management apparatus 1300, and may be one processor, or may be a collective term of a plurality of processing elements. For example, the processor 1301 is one or more central processing units (CPUs), or may be an application-specific integrated circuit (ASIC), or is configured as one or more integrated circuits for implementing the embodiments, for example, one or more microprocessors (DSPs) or one or more field programmable gate arrays (FPGAs).

The processor 1301 may perform various functions of the beam management apparatus 1300 by running or executing a software program stored in the memory 1302 and invoking data stored in the memory 1302.

During specific implementation, in an embodiment, the processor 1301 may include one or more CPUs, for example, a CPU 0 and a CPU 1 shown in FIG. 13.

During specific implementation, in an embodiment, the beam management apparatus 1300 may alternatively include a plurality of processors, for example, the processor 1301 and a processor 1304 shown in FIG. 13. Each of the processors may be a single-core processor (single-CPU), or may be a multi-core processor (multi-CPU). The processor herein may be one or more communication devices, circuits, and/or processing cores configured to process data (for example, computer program instructions).

The memory 1302 may be a read-only memory (ROM) or another type of static storage communication device capable of storing static information and instructions, or a random access memory (RAM) or another type of dynamic storage communication device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium capable of carrying or storing expected program code in a form of an instruction or a data structure and accessible by a computer. However, this is not limited thereto. The memory 1302 may be integrated with the processor 1301, or may exist independently, and is coupled to the processor 1301 through an input/output port (not shown in FIG. 13) of the beam management apparatus 1300. This is not limited in this embodiment.

For example, the input port may be configured to implement a receiving function performed by the terminal device, the positioning server, the access point, or the RIS in any one of the foregoing method embodiments, and the output port may be configured to implement a sending function performed by the terminal device, the positioning server, the access point, or the RIS in any one of the foregoing method embodiments.

The memory 1302 is configured to store a software program for executing the solutions, and the processor 1301 controls the execution. For the foregoing specific implementation, refer to the following method embodiments. Details are not described herein again.

The transceiver 1303 is configured to communicate with another beam management apparatus. For example, when the beam management apparatus 1300 is the terminal device, the transceiver 1303 may be configured to communicate with the positioning server, the access point, and/or the RIS. For another example, when the beam management apparatus 1300 is the positioning server, the transceiver 1303 may be configured to communicate with the terminal device, the access point, and/or the RIS. For another example, when the beam management apparatus 1300 is the access point, the transceiver 1303 may be configured to communicate with the terminal device, the positioning server, and/or the RIS. For another example, when the beam management apparatus 1300 is the RIS, the transceiver 1303 may be configured to communicate with the terminal device, the positioning server, and/or the access point. In addition, the transceiver 1303 may include a receiver and a transmitter (not separately shown in FIG. 13). The receiver is configured to implement a receiving function, and the transmitter is configured to implement a sending function. The transceiver 1303 may be integrated with the processor 1301, or may exist independently, and is coupled to the processor 1301 through an input/output port (not shown in FIG. 13) of the beam management apparatus 1300. This is not limited in this embodiment.

It should be noted that a structure of the beam management apparatus 1300 shown in FIG. 13 does not constitute a limitation on the beam management apparatus. An actual beam management apparatus may include more or fewer components than those shown in the figure, or combine some components, or have different component arrangements.

Actions of the terminal device in steps S301, S303, S307, S401, S407, S601, S603, S607, S701, S707, S901, S903, S1102, S1103, and S1115 may be performed by the processor 1301 in the beam management apparatus 1300 shown in FIG. 13 by invoking application program code stored in the memory 1302, to instruct the terminal device to perform.

Actions of the positioning server in steps S301a to S301c, S305 and S306, S305a, S402, S409, S601a to S601c, S608, S605c, S702, S709, S710, S901a, S905, S1101, S1103 and S1104, S1108, and S1111 to S1113 may be performed by the processor 1301 in the beam management apparatus 1300 shown in FIG. 13 by invoking application program code stored in the memory 1302, to instruct the positioning server to perform. This is not limited in this embodiment.

Actions of the access point in steps S302, S304, S403 to S405, S406, S408, S602, S604 to S606, S605a and S605b, S703 to S705, S706, S708, S902, S904, S1101, S1103, S1105 to S1107, S1109 and S1110, S1114, and S1116 may be performed by the processor 1301 in the beam management apparatus 1300 shown in FIG. 13 by invoking application program code stored in the memory 1302, to instruct the access point to perform. This is not limited in this embodiment.

Actions of the RIS in steps S307 and S607 may be performed by the processor 1301 in the beam management apparatus 1300 shown in FIG. 13 by invoking application program code stored in the memory 1302, to instruct the RIS to perform. This is not limited in this embodiment.

Figure 14:
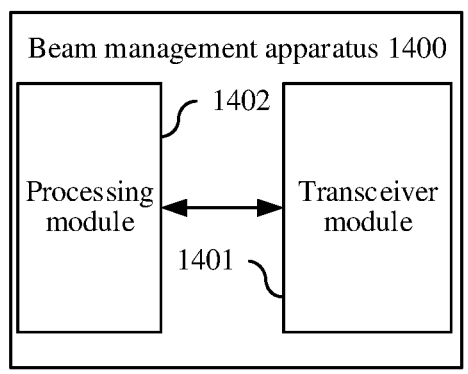
FIG. 14 is a schematic diagram of a structure of another beam management apparatus according to an embodiment.

FIG. 14 is a schematic diagram of a structure of another beam management apparatus according to an embodiment. For ease of description, FIG. 14 shows only main components of the beam management apparatus.

The beam management apparatus 1400 includes a transceiver module 1401 and a processing module 1402. The beam management apparatus 1400 may be the terminal device, the positioning server, or the access point in the foregoing method embodiments. The transceiver module 1401 may also be referred to as a transceiver unit, and is configured to implement receiving and sending functions performed by the terminal device, the positioning server, and the access point in any one of the foregoing method embodiments.

It should be noted that the transceiver module 1401 may include a receiving module and a sending module (not shown in FIG. 14). The receiving module is configured to receive data and/or signaling from another device. The sending module is configured to send data and/or signaling to the another device. A specific implementation of the transceiver module is not limited. The transceiver module may include a transceiver circuit, a transceiver machine, a transceiver, or a communication interface.

The processing module 1402 may be configured to implement a processing function performed by the terminal device, the positioning server, and the access point in any one of the foregoing method embodiments. The processing module 1402 may be a processor.

In this embodiment, the beam management apparatus 1400 is presented in a form of functional modules obtained through division in an integrated manner. The "module" herein may be a specific ASIC, a circuit, a processor that executes one or more software or firmware programs, a memory, an integrated logic circuit, and/or another component capable of providing the foregoing functions. In a simple embodiment, a person skilled in the art may figure out that the beam management apparatus 1400 may be in a form of the beam management apparatus 1300 shown in FIG. 13.

For example, the processor 1301 in the beam management apparatus 1300 shown in FIG. 13 may invoke computer-executable instructions stored in the memory 1302, so that the beam management method in the foregoing method embodiments is performed.

Functions/implementation processes of the transceiver module 1401 and the processing module 1402 in FIG. 14 may be implemented by the processor 1301 in the beam management apparatus 1300 shown in FIG. 13 by invoking the computer-executable instructions stored in the memory 1302. Alternatively, functions/implementation processes of the processing module 1402 in FIG. 14 may be implemented by the processor 1301 in the beam management apparatus 1300 shown in FIG. 13 by invoking the computer-executable instructions stored in the memory 1302, and functions/implementation processes of the transceiver module 1401 in FIG. 14 may be implemented by the transceiver 1303 in the beam management apparatus 1300 shown in FIG. 13.

Because the beam management apparatus 1400 provided in this embodiment may perform the foregoing beam management method, for effects that can be obtained by the beam management apparatus 1400, refer to the foregoing method embodiments. Details are not described herein again.

In a possible embodiment, the beam management apparatus 1400 shown in FIG. 14 is applicable to the communication system shown in FIG. 1, and performs functions of the terminal device in the beam management methods shown in FIG. 3, FIG. 6, and FIG. 9.

The processing module 1402 is configured to determine first measurement information based on information of a beam set, where the beam set is determined based on first location information of the beam management apparatus, the beam set includes one or more beams between an RIS and the beam management apparatus, and the first measurement information includes information determined by the beam management apparatus based on a beam corresponding to a downlink reference signal.

The transceiver module 1401 is configured to send the first measurement information.

The transceiver module 1401 is further configured to communicate with the RIS through a first beam, where the first beam is a beam in the beam set.

Optionally, the beam management apparatus 1400 may further include a storage module (not shown in FIG. 14), and the storage module stores a program or instructions. When the processing module 1402 executes the program or the instructions, the beam management apparatus 1400 may be enabled to perform functions of the terminal device in the beam management methods shown in FIG. 3, FIG. 6, and FIG. 9.

It should be noted that the beam management apparatus 1400 may be a terminal device, or may be a chip (system) or another part or component that may be disposed in the terminal device. This is not limited.

In addition, for effects of the beam management apparatus 1400, refer to the effects of the beam management methods shown in FIG. 3, FIG. 6, and FIG. 9. Details are not described herein again.

In another possible embodiment, the beam management apparatus 1400 shown in FIG. 14 is applicable to the communication system shown in FIG. 1, and performs functions of the positioning server or the access point in the beam management methods shown in FIG. 3, FIG. 6, and FIG. 9.

The processing module 1402 is configured to determine information of a first beam based on first measurement information and second measurement information, where the first beam is a beam in a beam set, the beam set is determined based on first location information of a terminal device, the beam set includes one or more beams between an RIS and the terminal device, the first measurement information includes information determined by the terminal device based on a beam corresponding to a downlink reference signal, and the second measurement information includes information determined by an access point based on a beam corresponding to an uplink reference signal.

The transceiver module 1401 is configured to send the information of the first beam.

Optionally, the beam management apparatus 1400 may further include a storage module (not shown in FIG. 14), and the storage module stores a program or instructions. When the processing module 1402 executes the program or the instructions, the beam management apparatus 1400 may be enabled to perform functions of the positioning server or the access point in the beam management methods shown in FIG. 3, FIG. 6, and FIG. 9.

It should be noted that the beam management apparatus 1400 may be a positioning server or an access point, or may be a chip (system) or another part or component that may be disposed in the positioning server or the access point. This is not limited.

In addition, for effects of the beam management apparatus 1400, refer to the effects of the beam management methods shown in FIG. 3, FIG. 6, and FIG. 9. Details are not described herein again.

In still another possible embodiment, the beam management apparatus 1400 shown in FIG. 14 is applicable to the communication system shown in FIG. 1, and performs functions of the access point in the beam management methods shown in FIG. 3, FIG. 6, and FIG. 9.

The processing module 1402 is configured to obtain second measurement information based on information of a beam set, where the beam set is determined based on first location information of a terminal device, the beam set includes one or more beams between anRIS and the terminal device, and the second measurement information includes information determined by the beam management apparatus based on a beam corresponding to an uplink reference signal.

The transceiver module 1401 is configured to send the second measurement information.

Optionally, the beam management apparatus 1400 may further include a storage module (not shown in FIG. 14), and the storage module stores a program or instructions. When the processing module 1402 executes the program or the instructions, the beam management apparatus 1400 may perform functions of the access point in the beam management methods shown in FIG. 3, FIG. 6, and FIG. 9.

It should be noted that the beam management apparatus 1400 may be an access point, or may be a chip (system) or another part or component that may be disposed in the access point. This is not limited.

In addition, for effects of the beam management apparatus 1400, refer to the effects of the beam management methods shown in FIG. 3, FIG. 6, and FIG. 9. Details are not described herein again.

Figure 15:
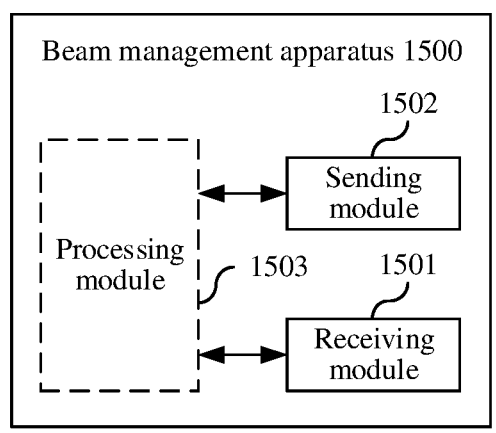
FIG. 15 is a schematic diagram of a structure of still another beam management apparatus according to an embodiment.

FIG. 15 is a schematic diagram of a structure of still another beam management apparatus according to an embodiment. For ease of description, FIG. 15 shows only main components of the beam management apparatus.

The beam management apparatus 1500 includes a receiving module 1501 and a sending module 1502. The beam management apparatus 1500 may be the RIS in the foregoing method embodiments. The receiving module 1501 may also be referred to as a receiving unit, and is configured to implement a receiving function performed by the RIS in any one of the foregoing method embodiments. The sending module 1502 may also be referred to as a sending unit, and is configured to implement a sending function performed by the RIS in any one of the foregoing method embodiments.

It should be noted that the receiving module 1501 and the sending module 1502 may be separately disposed, or may be integrated into one module, such as a transceiver module. Specific implementations of the receiving module 1501 and the sending module 1502 are not limited. The receiving module 1501 is configured to receive data and/or signaling from a terminal device, a positioning server, and/or an access point. The sending module 1502 is configured to send data and/or signaling to the terminal device, the positioning server, and/or the access point.

The beam management apparatus 1500 may further include a processing module 1503. The processing module 1503 may be configured to implement a processing function performed by the RIS in any one of the foregoing method embodiments. The processing module 1503 may be a processor.

In this embodiment, the beam management apparatus 1500 is presented in a form of functional modules obtained through division in an integrated manner. The "module" herein may be a specific ASIC, a circuit, a processor that executes one or more software or firmware programs, a memory, an integrated logic circuit, and/or another component capable of providing the foregoing functions. In a simple embodiment, a person skilled in the art may figure out that the beam management apparatus 1500 may be in a form of the beam management apparatus 1300 shown in FIG. 13.

For example, the processor 1301 in the beam management apparatus 1300 shown in FIG. 13 may invoke computer-executable instructions stored in the memory 1302, so that the beam management method in the foregoing method embodiments is performed.

Functions/implementation processes of the receiving module 1501, the sending module 1502, and the processing module 1503 in FIG. 15 may be implemented by the processor 1301 in the beam management apparatus 1300 shown in FIG. 13 by invoking the computer-executable instructions stored in the memory 1302. Alternatively, functions/implementation processes of the processing module 1503 in FIG. 15 may be implemented by the processor 1301 in the beam management apparatus 1300 shown in FIG. 13 by invoking the computer-executable instructions stored in the memory 1302, and functions/implementation processes of the receiving module 1501 and the sending module 1502 in FIG. 15 may be implemented by the transceiver 1303 in the beam management apparatus 1300 shown in FIG. 13.

Because the beam management apparatus 1500 provided in this embodiment may perform the foregoing beam management method, for effects that can be obtained by the beam management apparatus 1500, refer to the foregoing method embodiments. Details are not described herein again.

In a possible embodiment, the beam management apparatus 1500 shown in FIG. 15 is applicable to the communication system shown in FIG. 1, and performs functions of the RIS in the beam management methods shown in FIG. 3, FIG. 6, and FIG. 9.

The sending module 1502 is configured to send positioning parameter information, where the positioning parameter information includes location information of the beam management apparatus 1500.

The receiving module 1501 is configured to receive information of a first beam, where the information of the first beam includes information of a beam between the beam management apparatus 1500 and a terminal device, the first beam is a beam in a beam set, the beam set is determined based on first location information of the terminal device, and the beam set includes one or more beams between the beam management apparatus 1500 and the terminal device.

The sending module 1502 and the receiving module 1501 are further configured to communicate with the terminal device through the first beam.

Optionally, the sending module 1502 is configured to implement a sending function related to communication with the terminal device through the first beam. The receiving module 1501 is configured to implement a receiving function related to the communication with the terminal device through the first beam.

Optionally, the beam management apparatus 1500 may further include a storage module (not shown in FIG. 15), and the storage module stores a program or instructions. The beam management apparatus 1500 may further include the processing module 1503. When the processing module executes the program or the instructions, the beam management apparatus 1500 may be enabled to perform functions of the RIS in the beam management methods shown in FIG. 3, FIG. 6, and FIG. 9.

It should be noted that the beam management apparatus 1500 may be a RIS, or may be a chip (system) or another part or component that may be disposed in the RIS. This is not limited.

In addition, for effects of the beam management apparatus 1500, refer to the effects of the beam management methods shown in FIG. 3, FIG. 6, and FIG. 9. Details are not described herein again.

An embodiment provides a communication system. The communication system includes a terminal device, a positioning server, an access point, and a RIS. The terminal device is configured to perform actions of the terminal device in the foregoing method embodiments. For a specific execution method and process, refer to the foregoing method embodiments. Details are not described herein again.

The positioning server is configured to perform actions of the positioning server in the foregoing method embodiments. For a specific execution method and process, refer to the foregoing method embodiments. Details are not described herein again.

Optionally, in this embodiment, the positioning server may be further disposed in a specific access point.

The access point is configured to perform actions of the access point in the foregoing method embodiments. For a specific execution method and process, refer to the foregoing method embodiments. Details are not described herein again.

The RIS is configured to perform actions of the RIS in the foregoing method embodiments. For a specific execution method and process, refer to the foregoing method embodiments. Details are not described herein again.

An embodiment provides a chip system. The chip system includes a processor and an input/output port. The processor may be configured to implement a processing function related to the beam management method provided in the embodiments, and the input/output port may be configured to perform receiving and sending functions related to the beam management method provided in the embodiments.

For example, the input port may be configured to implement the receiving function related to the beam management method provided in the embodiments, and the output port may be configured to implement the sending function related to the beam management method provided in the embodiments.

In a possible embodiment, the chip system further includes a memory. The memory is configured to store program instructions and data for implementing functions related to the beam management method provided in the embodiments.

The chip system may include a chip, or may include a chip and another discrete component.

An embodiment provides a non-transitory computer-readable storage medium. The non-transitory computer-readable storage medium includes a computer program or instructions. When the computer program or the instructions are run on a computer, the beam management method provided in the embodiments is performed.

An embodiment provides a computer program product. The computer program product includes a computer program or instructions. When the computer program or the instructions are run on a computer, the beam management method provided in the embodiments is performed.

It should be understood that, the processor in the embodiments may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It may be further understood that the memory in the embodiments may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. By way of an example, but not limitative descriptions, many forms of random access memories (RAMs) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented using software, hardware (for example, a circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on a computer, the procedure or functions according to the embodiments are all or partially generated. The computer may be a general-purpose computer, a dedicated computer, a computer network, or another programmable apparatus. The computer instructions may be stored in a non-transitory computer-readable storage medium, or transmitted from one non-transitory computer-readable storage medium to another non-transitory computer-readable storage medium. For example, the computer instructions may be transmitted from one website, computer, server, or data center to another website, computer, server, or data center in a wired (for example, infrared, radio, or microwave) manner. The non-transitory computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" describes only an association relationship between associated objects and represents that three relationships may exist. For example, A and/or B may represent the following three cases: only A exists, both A and B exist, and only B exists. A and B may be singular or plural. In addition, the character "/" can represent an "or" relationship between the associated objects, but may also represent an "and/or" relationship. For details, refer to the context for understanding.

In the embodiments, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that, in the embodiments, sequence numbers of the foregoing processes do not mean execution sequences. The execution sequences of the processes should be determined based on functions and internal logic of the processes, and should not constitute any limitation on implementation processes of the embodiments.

A person of ordinary skill in the art may be aware that, in combination with the examples described in the embodiments, units and algorithm steps can be implemented by electronic hardware or a combination of computer software and electronic hardware. Whether the functions are performed by hardware or software depends on particular applications and design constraint conditions of the solutions. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the system, apparatus, and method may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one place, or may be distributed on a plurality of network units. Some or all of the units may be selected based on actual requirements to achieve the objectives of the solutions of the embodiments.

In addition, functional units in the embodiments may be integrated into one processing unit, each of the units may exist alone physically, or two or more units are integrated into one unit.

When the functions are implemented in a form of a software functional unit and sold or used as an independent product, the functions may be stored in a non-transitory computer-readable storage medium. Based on such an understanding, the solutions essentially, or the part contributing to the conventional technology, or some of the solutions may be implemented in a form of a software product. The computer software product is stored in a non-transitory storage medium, and includes several instructions for instructing a computer device (which may be a personal computer, a server, a network device, or the like) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any variation or replacement readily figured out by a person skilled in the art within the scope in this embodiments shall fall within the scope of the embodiments.

What is claimed is:

1. A beam management method, comprising:
   determining first measurement information based on information of a beam set, wherein the beam set is determined based on first location information of a terminal device, the beam set comprises one or more beams between a reconfigurable intelligent meta-surface (RIS) and the terminal device, and the first measurement information comprises information determined by the terminal device based on a beam corresponding to a downlink reference signal;
   sending the first measurement information;
   receiving resource information determined based upon an observed time difference of arrival (OTDOA), wherein the resource information comprises a time frequency resource and slot indication information; and
   communicating with the RIS through a first beam, wherein the first beam is a beam in the beam set.

2. The beam management method according to claim 1, further comprising:
   obtaining third measurement information based on positioning parameter information, wherein the positioning parameter information comprises location information of the RIS, and the third measurement information comprises information determined by the terminal device based on time of arrival of the downlink reference signal.

3. The beam management method according to claim 2, wherein the positioning parameter information further comprises an identifier of an access point and location information of the access point.

4. The beam management method according to claim 2, further comprising:
   sending the third measurement information.

5. The beam management method according to claim 2, further comprising:
   receiving the positioning parameter information.

6. The beam management method according to claim 1, further comprising:
   receiving the information of the beam set.

7. The beam management method according to claim 1, further comprising:
   receiving information of the first beam, wherein the information of the first beam comprises information of a beam between the RIS and the terminal device.

8. The beam management method according to claim 1, wherein the beam set is a subset of a first set, and the first set comprises all beams between the RIS and the terminal device.

9. The beam management method according to claim 1, wherein the slot indication information indicates a slot for measuring an uplink reference signal and the downlink reference signal.

10. A beam management method, comprising:
   determining information of a first beam based on first measurement information and second measurement information, wherein the first beam is a beam in a beam set, the beam set is determined based on first location information of a terminal device, the beam set comprises one or more beams between a reconfigurable intelligent meta-surface (RIS) and the terminal device, the first measurement information comprises information determined by the terminal device based on a beam corresponding to a downlink reference signal, and the second measurement information comprises information determined by an access point based on a beam corresponding to an uplink reference signal;
   receiving resource information determined based upon an observed time difference of arrival (OTDOA), wherein the resource information comprises a time frequency resource and slot indication information; and
   sending the information of the first beam.

11. The beam management method according to claim 10, further comprising:
   determining the first location information based on third measurement information and fourth measurement information, wherein the third measurement information comprises information determined by the terminal device based on time of arrival of the downlink reference signal, and the fourth measurement information comprises information determined by the access point based on time of arrival of the uplink reference signal.

12. The beam management method according to claim 11, further comprising:
   sending positioning parameter information, wherein the positioning parameter information comprises location information of the RIS.

13. A beam management method, comprising:
   obtaining second measurement information based on information of a beam set, wherein the beam set is determined based on first location information of a terminal device, the beam set comprises one or more beams between a reconfigurable intelligent meta-surface (RIS) and the terminal device, and the second measurement information comprises information determined by an access point based on a beam corresponding to an uplink reference signal;
   sending the second measurement information; and
   receiving resource information determined based upon an observed time difference of arrival (OTDOA), wherein the resource information comprises a time frequency resource and slot indication information.

14. The beam management method according to claim 13, further comprising:
   obtaining fourth measurement information based on positioning parameter information, wherein the positioning parameter information comprises location information of the RIS, and the fourth measurement information comprises information determined by the access point based on time of arrival of the uplink reference signal.

15. The beam management method according to claim 14, wherein the positioning parameter information further comprises an identifier of the access point and location information of the access point.

16. The beam management method according to claim 14, further comprising:
   sending the fourth measurement information.

17. The beam management method according to claim 14, further comprising:
   receiving the positioning parameter information.

18. The beam management method according to claim 13, further comprising:
   receiving the information of the beam set.

19. The beam management method according to claim 13, wherein the beam set is a subset of a first set, and the first set comprises all beams between the RIS and the terminal device.

20. The beam management method according to claim 13, wherein the slot indication information indicates a slot for measuring the uplink reference signal and a downlink reference signal.

* * * * *